(12) United States Patent
Larsson et al.

(10) Patent No.: US 10,587,386 B2
(45) Date of Patent: Mar. 10, 2020

(54) MULTIPLEXING OF PERIODIC CHANNEL STATE INFORMATION ON PHYSICAL UPLINK SHARED CHANNEL TOGETHER WITH HYBRID AUTOMATIC REPEAT REQUEST ACKNOWLEDGEMENT

(71) Applicant: Telefonaktiebolaget LM Ericsson (Publ), Stockholm (SE)

(72) Inventors: Daniel Larsson, Lund (SE); Robert Baldemair, Solna (SE); Sorour Falahati, Stockholm (SE); Sebastian Faxér, Järfälla (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/245,407

(22) Filed: Jan. 11, 2019

(65) Prior Publication Data

US 2019/0222395 A1 Jul. 18, 2019

Related U.S. Application Data

(60) Provisional application No. 62/617,128, filed on Jan. 12, 2018.

(51) Int. Cl.
*H04L 5/00* (2006.01)
*H04L 1/18* (2006.01)
*H04L 1/16* (2006.01)
*H04W 24/10* (2009.01)
*H04W 72/12* (2009.01)

(52) U.S. Cl.
CPC .......... *H04L 5/0055* (2013.01); *H04L 1/1664* (2013.01); *H04L 1/1812* (2013.01); *H04L 1/1887* (2013.01); *H04L 5/0057* (2013.01); *H04W 24/10* (2013.01); *H04W 72/1289* (2013.01); *H04L 1/1671* (2013.01)

(58) Field of Classification Search
None
See application file for complete search history.

(56) References Cited

U.S. PATENT DOCUMENTS

2012/0184265 A1* 7/2012 Love ................. H04W 72/1215
455/424
2013/0083753 A1* 4/2013 Lee ................... H04W 72/0453
370/329

(Continued)

OTHER PUBLICATIONS

3GPP TS 38.212 ver. 15.2.0 Rel. 15 5G NR Multiplexing and Channel Coding, submitted as art by the applicant (Year: 2017).*

(Continued)

*Primary Examiner* — Jamaal Henson
(74) *Attorney, Agent, or Firm* — Christopher & Weisberg, P.A.

(57) ABSTRACT

A method, system and apparatus are disclosed. A wireless device (WD) configured to communicate with a network node is provided. The WD configured to, and/or comprising a radio interface and/or processing circuitry configured to receive a Downlink Control Information (DCI) message for scheduling transmission on a Physical Uplink Shared Channel (PUSCH) in which the DCI message not containing an indication of how many resources to reserve for Hybrid Automatic Repeat Request (HARQ) bits, and optionally, transmit on the scheduled PUSCH based on the DCI message.

19 Claims, 11 Drawing Sheets

(56) References Cited

U.S. PATENT DOCUMENTS

| | | | | |
|---|---|---|---|---|
| 2013/0121274 A1* | 5/2013 | Chen | .................... | H04L 5/0053 370/329 |
| 2014/0029552 A1* | 1/2014 | Lv | ........................ | H04L 1/1887 370/329 |
| 2014/0161084 A1* | 6/2014 | Yang | .................... | H04L 1/1822 370/329 |
| 2014/0169319 A1* | 6/2014 | Yang | ................ | H04W 72/0413 370/329 |
| 2014/0219202 A1* | 8/2014 | Kim | .................... | H04L 1/1861 370/329 |
| 2015/0295689 A1* | 10/2015 | Lee | ........................ | H04L 5/001 370/329 |
| 2019/0037586 A1* | 1/2019 | Park | .................. | H04W 72/1284 |
| 2019/0081762 A1* | 3/2019 | Yang | .................... | H04W 76/28 |

OTHER PUBLICATIONS

3GPP TS 38.212 ver. 15.2.0 Rel. 15 5G NR Multiplexing and Channel Coding, submitted by the applicant (Year: 2017).*

3GPP TS 38.212 V2.0.0 (Feb. 2017) 3rd Generation Partnership Project; Technical Specification Group Radio Access Network; NR; Multiplexing and Channel Coding (Release 15), consisting of 82 pages.

International Search Report and Written Opinion dated Apr. 18, 2019 for International Application No. PCT/EP2019/050606 filed on Jan. 11, 2019, consisting of 16-pages.

3GPP TSG RAN WG1 Meeting 91 R1-1719927; Title: UCI on PUSCH and UL channel multiplexing for NR; Agenda Item: 7.3.2.3; Source: LG Electronics; Document for: Discussion and decision; Location and Date: Reno, USA, Nov. 27-Dec. 1, 2017, consisting of 17-pages.

3GPP TSG RAN WG1 Meeting 91 R1-1720819; Title: UCI multiplexing; Agenda Item: 7.3.2.3; Source: NTT DOCOMO, Inc.; Document for: Discussion and Decision; Location and Date: Reno, USA, Nov. 27-Dec. 1, 2017, consisting of 5-pages.

3GPP TSG RAN WG1 Meeting 91 R1-1719573; Title: Discussion on UCI on PUSCH; Agenda Item: 7.3.2.3; Source: MediaTek Inc.; Document for: Discussion; Location and Date: Reno, USA, Nov. 27-Dec. 1, 2017, consisting of 7-pages.

* cited by examiner

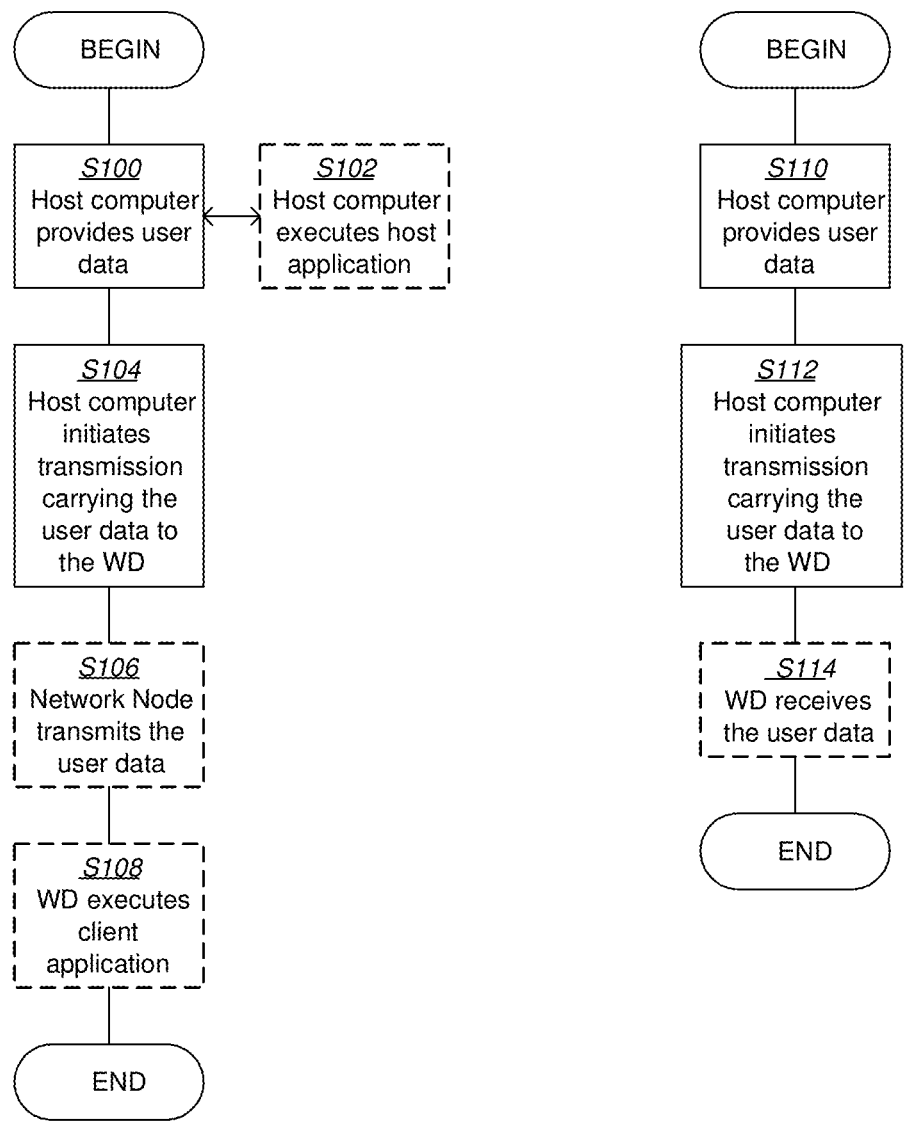

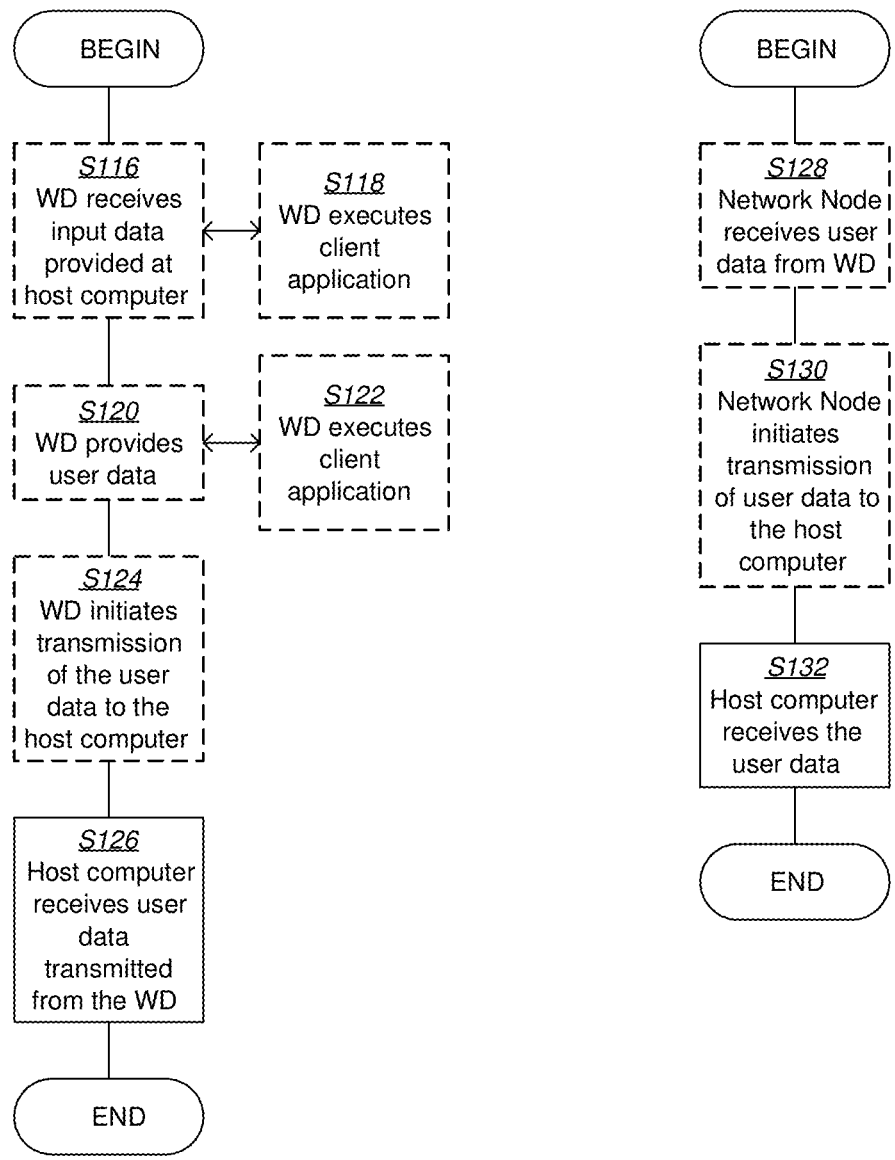

US 10,587,386 B2

MULTIPLEXING OF PERIODIC CHANNEL STATE INFORMATION ON PHYSICAL UPLINK SHARED CHANNEL TOGETHER WITH HYBRID AUTOMATIC REPEAT REQUEST ACKNOWLEDGEMENT

CROSS REFERENCE TO RELATED APPLICATION

The present application claims priority to and the benefit of the filing date of U.S. Provisional Patent Application Ser. No. 62/617,128, filed Jan. 12, 2018, which is incorporated herein by reference in its entirety.

FIELD

The present disclosure relates to wireless communications, and in particular, to avoid data loss on the Physical Uplink Shared Channel due to periodic Channel State Information (CSI) reporting.

INTRODUCTION

Uplink Control Information (UCI) on Physical Uplink Shared Channel (PUSCH) in Long Term Evolution (LTE)

In Long Term Evolution (LTE), Uplink Control Information (UCI) on PUSCH is mapped to a resource grid as illustrated in FIG. 14. In particular, FIG. 14 is a block diagram of a UCI mapping in LTE, where the x-axis shows Discrete Fourier Transform Spreading Orthogonal Frequency Division Multiplexing (DFTS-OFDM) symbols while the z-axis shows the time within a DFTS-OFDM symbol. Acknowledgement (ACK)/Negative ACK (NACK) is mapped to Discrete Fourier Transform Spreading Orthogonal Frequency Division Multiplexing (DFTS-OFDM) symbols closest to DeModulation Reference Signal (DM-RS), Rank Indicator (RI) is mapped to a next consecutive symbol. Precoder Matrix Index (PMI)/Channel Quality Information (CQI) is mapped to all DFTS-OFDM symbols (except those carrying DM-RS). ACK/NACK and RI are mapped close to DM-RS to benefit from the more current channel estimate.

UCI in New Radio (NR)

Channel State Information (CSI) in NR is split into two parts, CSI Part 1 and CSI Part2 which are separately encoded. CSI Part 1 has a fixed (determined via Radio Resource Control (RRC) configuration) size and contains the length of CSI Part 2, i.e., Part 1 must be decoded in order to determine the length of Part 2.

PUSCH is rate matched around ACK/NACK ("AN") for more than 2 AN bits and punctured for 1 or 2 AN bits. In case of rate matching, AN is mapped, followed by CSI Part 1, then followed by CSI Part 2. For punctured AN, a certain amount of resources (resource elements) are reserved. CSI Part 1 is not mapped on the reserved resources, and CSI Part 1 mapping depends on the amount of reserved resources. FIG. 15 is block diagram of punctured acknowledgement/ negative acknowledgement. CSI part 2 can be mapped on the reserved resources and also on resources after CSI part 1. Data (UL-SCH) is mapped on remaining reserved resources and other remaining resources. AN is transmitted on the reserved resources, i.e., AN punctures PUSCH and CSI Part 2.

SUMMARY

Some embodiments advantageously provide methods, systems, and apparatuses for helping avoid data loss on the PUSCH due to periodic CSI.

In some embodiments there is provided a method implemented in a wireless device. The method includes receiving a Downlink Control Information (DCI) message for scheduling transmission on a Physical Uplink Shared Channel (PUSCH). The DCI message does not contain an indication of how many resources to reserve for Hybrid Automatic Repeat Request (HARQ) bits. The method further includes reserving resources on the scheduled PUSCH for 2 HARQ bits.

In some embodiments there is provided a method implemented in a network node. The method includes scheduling the wireless device on a Physical Uplink Shared Channel (PUSCH) using a Downlink Control Information (DCI) message. The DCI message does not contain an indication of how many resources to reserve for Hybrid Automatic Repeat Request (HARQ) bits. The method further includes transmitting the DCI message to the wireless device.

In some embodiments a wireless device is provided. The wireless device is configured to communicate with a network node. The wireless device includes a radio interface and a processing circuitry. The processing circuit is configured to determine a scheduling of a Physical Uplink Shared Channel (PUSCH) based on a DCI message. The DCI message does not contain an indication of how many resources to reserve for Hybrid Automatic Repeat Request (HARQ) bits. The processing circuitry is further configured to reserve resources on the scheduled PUSCH for 2 HARQ bits.

In some embodiments a network node is provided. The network node is configured to communicate with a wireless device. The network node comprising a radio interface and comprising processing circuitry. The processing circuit is configured to schedule the wireless device on a Physical Uplink Shared Channel (PUSCH) using a Downlink Control Information (DCI) message. The DCI message not containing an indication of how many resources to reserve for Hybrid Automatic Repeat Request (HARQ) bits. The network node is further configured to transmit the DCI message to the wireless device.

The disclosure provides for one or more embodiments for avoiding data loss on the PUSCH due to periodic CSI and missed DL assignments on PUSCH that have been scheduled by fallback DCI. In one or more embodiments, the CSI is not multiplexed (i.e., drop) on PUSCH if the PUSCH is scheduled by a fallback DCI, i.e., DCI format 0_0. Therefore, the disclosure advantageously helps prevent data loss on PUSCH.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 6-9 are flow charts illustrating exemplary methods implemented in a communication system including a host computer, a network node and a wireless device according to some embodiments of the present disclosure;

DETAILED DESCRIPTION

Figure 1:
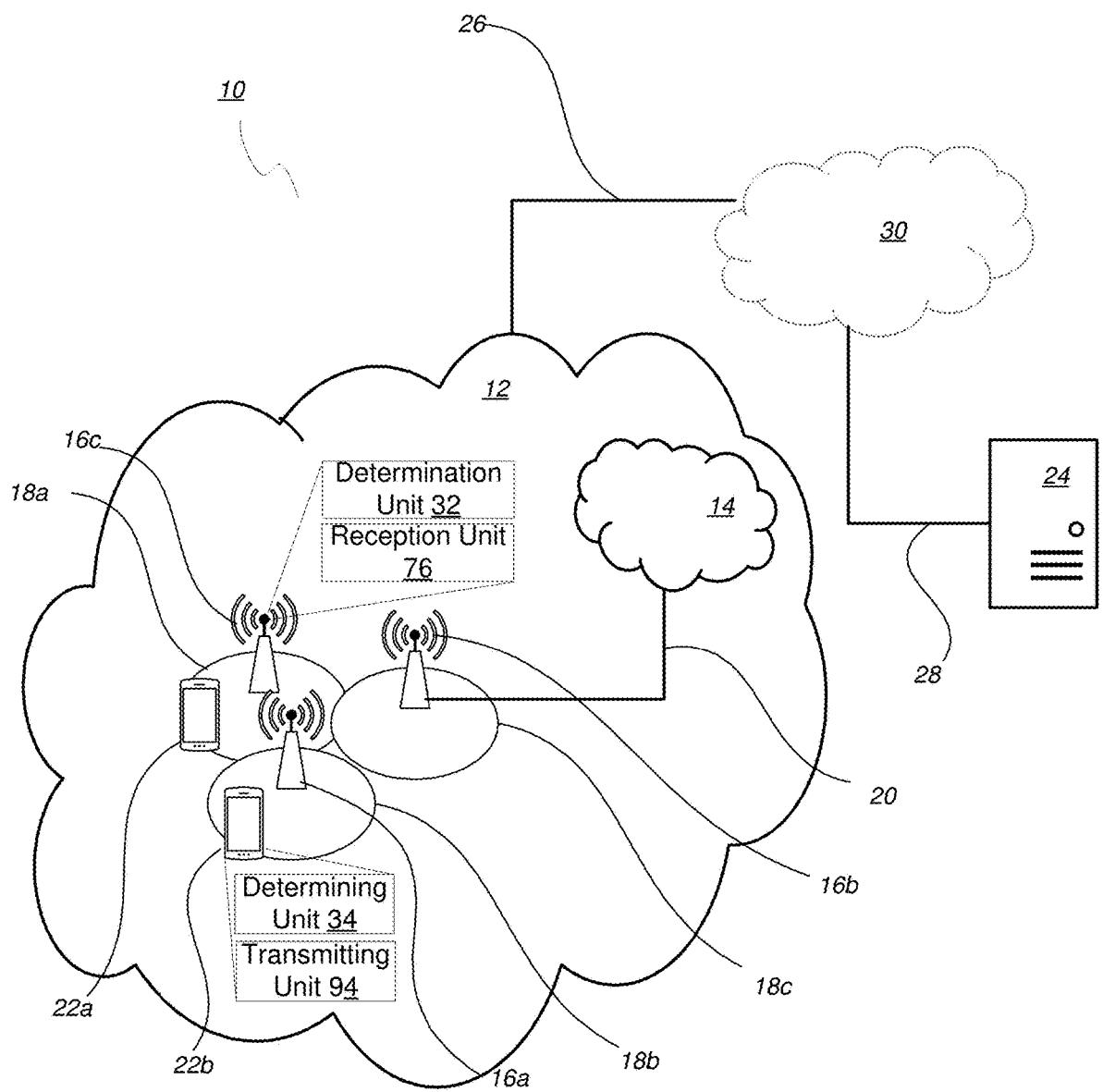
FIG. 1 is a schematic diagram of an exemplary network architecture illustrating a communication system connected via an intermediate network to a host computer according to the principles in the present disclosure.

There is no existing agreement as to how to determine the amount of reserved resources for punctured ACK/NACK. In principal, a very similar (same) formula can be used as with rate-matched AN, i.e., $$Q'_{ACK} = \min\left\{ \left\lceil \frac{(O_{ACK} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \sum_{l=0}^{N_{symb,all}^{PUSCH}-1} M_{sc}^{\Phi UCI}(l) \right\}$$

The number of ACK/NACK bits $O_{ACK}$ follows from the Downlink Assignment Index (DAI) in the UL grant. One option is to multiply the obtained amount of resources (the left side of argument/equation in the min( ) function) by a factor larger than 1 to simplify Discontinuous Transmission (DTX) detection at gNB.

In the fallback Downlink Control Information (DCI), no UL DAI is included. Here, $O_{ACK}$ can be derived from the detected number of DL assignments. If the wireless device misses a DL assignment, the wireless device will determine a wrong number of $O_{ACK}$. The fallback DCI is likely to be used for small ACK/NACK payloads and up to 2 bit ACK/NACK is punctured, which may provide robustness towards missed DL assignments. For more than 2 bit ACK/NACK is rate matched and a wrong $O_{ACK}$ that results in wrong rate matching and lost PUSCH transmissions. Given that fallback DCI is mainly used with small ACK/NACK payloads (puncturing), this issue may not be so severe.

However, even for small (punctured) ACK/NACK payloads, missed DL assignments can lead to lost PUSCH transmission. Depending on $O_{ACK}$, the number of reserved resources is determined. If the wireless device uses a different $O_{ACK}$ than the network node, e.g., gNB, the number of reserved resources is different. Since CSI part 1 (CSI1) is not to be mapped to reserved resources, gNB and UE assume different CSI1 mapping resulting in lost CSI1. Further, since PUSCH is rate matched around CSI1, even PUSCH is lost.

The disclosure solves at least one of the problems with existing systems by providing for one or more embodiments for avoiding data loss on the PUSCH due to periodic CSI and missed DL assignments on PUSCH that have been scheduled by fallback DCI. In one or more embodiments, the CSI is not multiplexed (i.e., drop) on PUSCH if the PUSCH is scheduled by a fallback DCI, i.e., DCI format 0_0. Therefore, the disclosure advantageously helps prevent data loss on PUSCH.

Before describing in detail exemplary embodiments, it is noted that the embodiments reside primarily in combinations of apparatus components and processing steps related to helping avoid data loss on the PUSCH due to periodic CSI. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for avoiding data loss on the PUSCH due to periodic CSI and missed DL assignments on PUSCH that have been scheduled by fallback DCI. In one or more embodiments, the CSI is not multiplexed (i.e., drop) on PUSCH if the PUSCH is scheduled by a fallback DCI, i.e., DCI format 0_0. Therefore, the disclosure advantageously helps prevent data loss on PUSCH.

Returning to the drawing figures, in which like elements are referred to by like reference numerals, there is shown in FIG. 1 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22 towards the host computer 24.

A network node 16 is configured to include a determination unit 32 which is configured to determine to schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits, and transmit the DCI message to the wireless device.

The network node 16 may be configured to includes a reception unit 76 which is configured to receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

A wireless device 22 is configured to include a determining unit 34 which is configured to receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits, and determine to transmit on the scheduled PUSCH based on the DCI message.

A wireless device 22 is configured to include a transmitting unit 94 which is configured to determine to transmit on a scheduled Physical Uplink Shared Channel (PUSCH) based on a DCI message, the DCI message not containing an indication of how many resources to reserve for Hybrid Automatic Repeat Request (HARQ) bits, and transmit on the scheduled PUSCH based on the determination.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to determine to schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits ( ), and transmit the DCI message to the wireless device, as described herein. The processing circuitry 68 may also include reception unit 76 configured to receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determining unit 34 configured to receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits, and determine to transmit on the scheduled PUSCH based on the DCI message.

The processing circuitry 84 may also include transmitting unit 94 configured to determine to transmit on a scheduled Physical Uplink Shared Channel (PUSCH) based on a DCI message, the DCI message not containing an indication of how many resources to reserve for Hybrid Automatic Repeat Request (HARQ) bits, and transmit on the scheduled PUSCH based on the determination.

Figure 2:
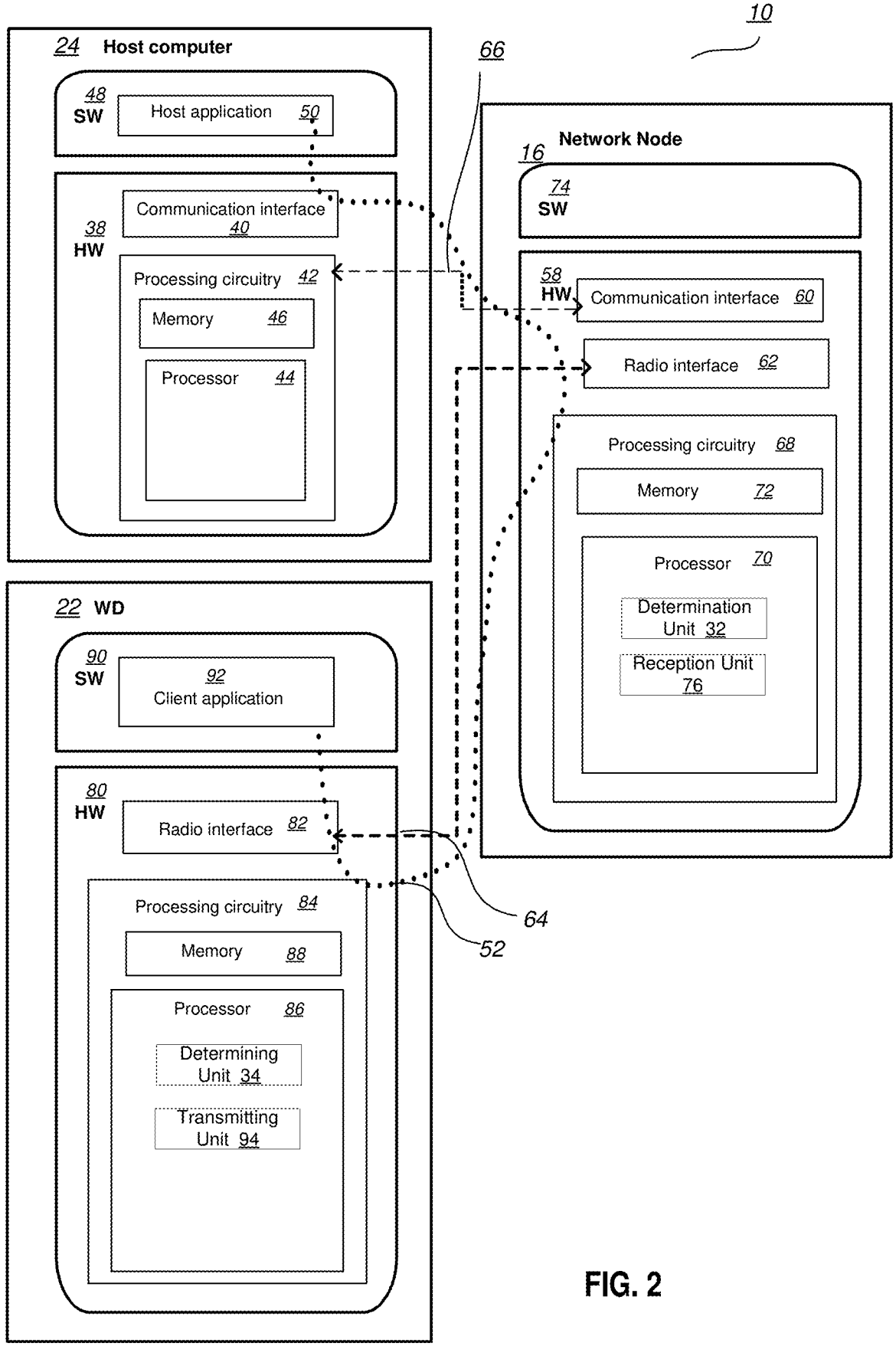
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 1 and 2 show various "units" such as determination unit 32, determining unit 34, reception unit 76 and transmitting unit 94 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
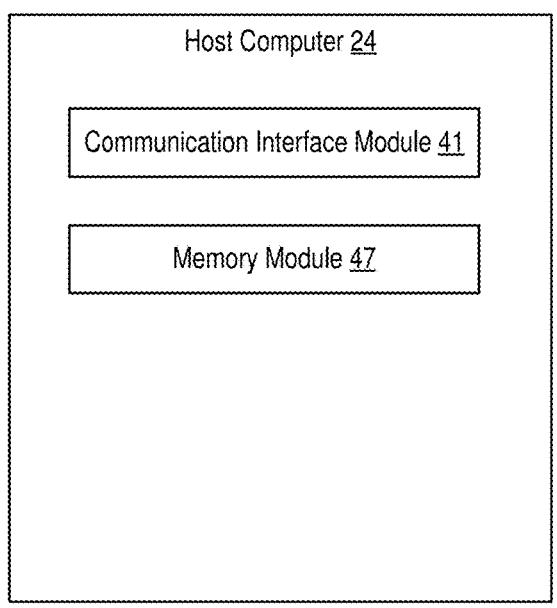
FIG. 3 is a block diagram of an alternative embodiment of a host computer according to some embodiments of the present disclosure.

FIG. 3 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 4:
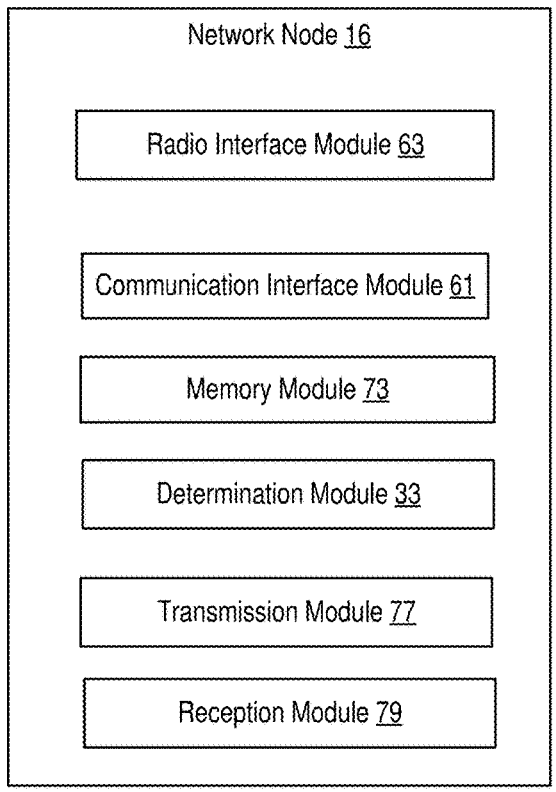
FIG. 4 is a block diagram of an alternative embodiment of a network node according to some embodiments of the present disclosure.

FIG. 4 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The determination module 33 is configured to determine to schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits. The transmission module 77 is configured to transmits the DCI message to the wireless device. The reception module 79 is configured to receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Figure 5:
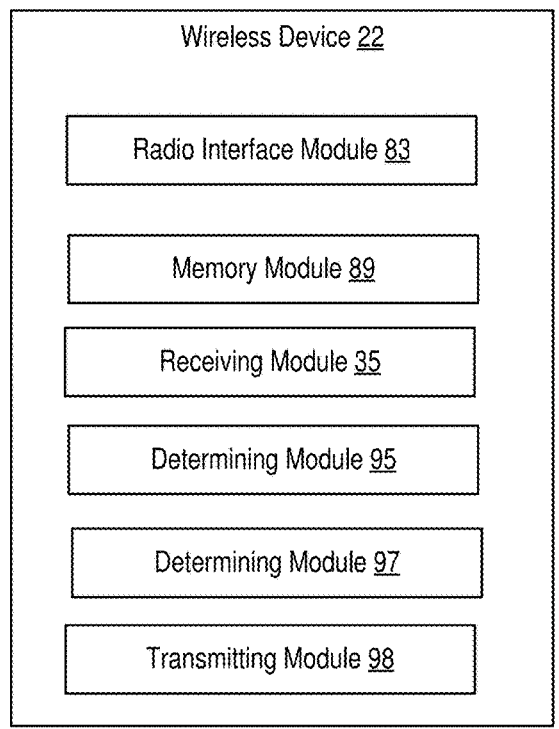
FIG. 5 is a block diagram of an alternative embodiment of a wireless device according to some embodiments of the present disclosure.

FIG. 5 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The receiving module 35 is configured to receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits. The determining module 95 is configured to determine to transmit on the scheduled PUSCH based on the DCI message. The determining module 97 is configured to determine to transmit on a scheduled Physical Uplink Shared Channel (PUSCH) based on a DCI message, the DCI message not containing an indication of how many resources to reserve for Hybrid Automatic Repeat Request (HARQ) bits. The transmitting module 98 is configured to transmit on the scheduled PUSCH based on the determination.

FIG. 6 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 22 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 7 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 8 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 9 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 10:
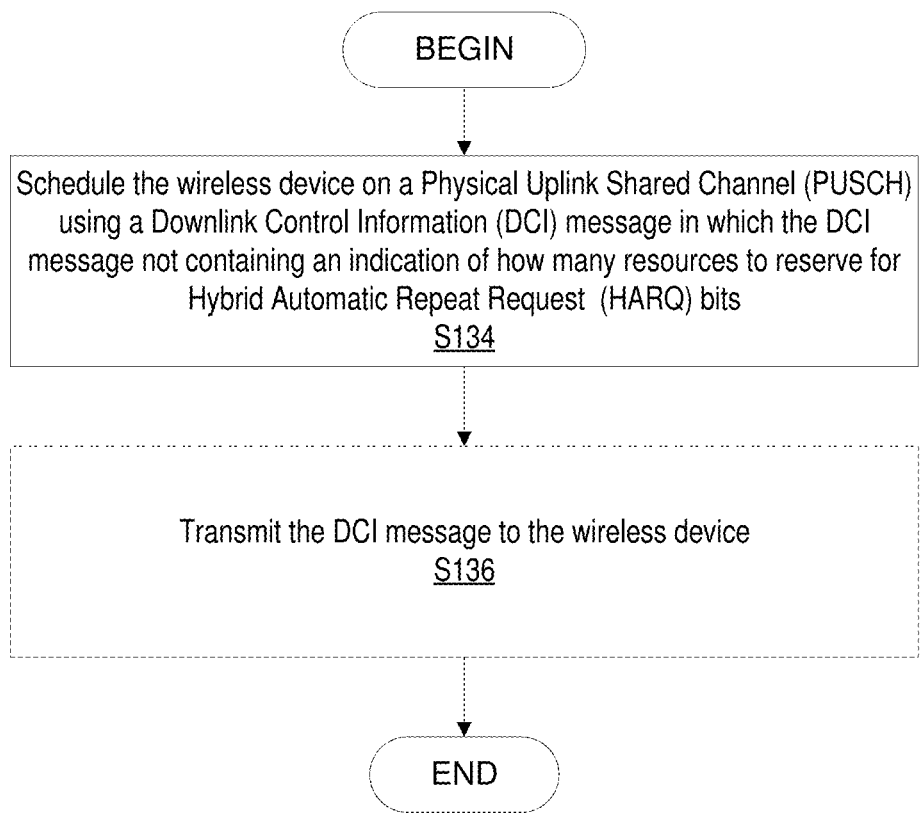
FIG. 10 is a flowchart of an exemplary process in a network node for scheduling PUSCH using a DCI message according to some embodiments of the present disclosure.

FIG. 10 is a flowchart of an exemplary process in a network node 16 for scheduling PUSCH using a DCI message according to some embodiments of the present disclosure. Processing circuitry 68 is configured to schedule the wireless device 22 on a Physical Uplink Shared Channel (PUSCH) using a Downlink Control Information (DCI) message in which the DCI message not containing an indication of how many resources to reserve for Hybrid Automatic Repeat Request (HARQ) bits (block S134). Processing circuitry 68 is further configured to, optionally, transmit the DCI message to the wireless device 22 (block S136). In one or more embodiments, the DCI message not containing the indication of how many resources to reserve for HARQ bits corresponds to the DCI message not indicating an uplink (UL) downlink assignment index (DAI). In one or more embodiments, the DCI message is of DCI format 0_0.

Figure 11:
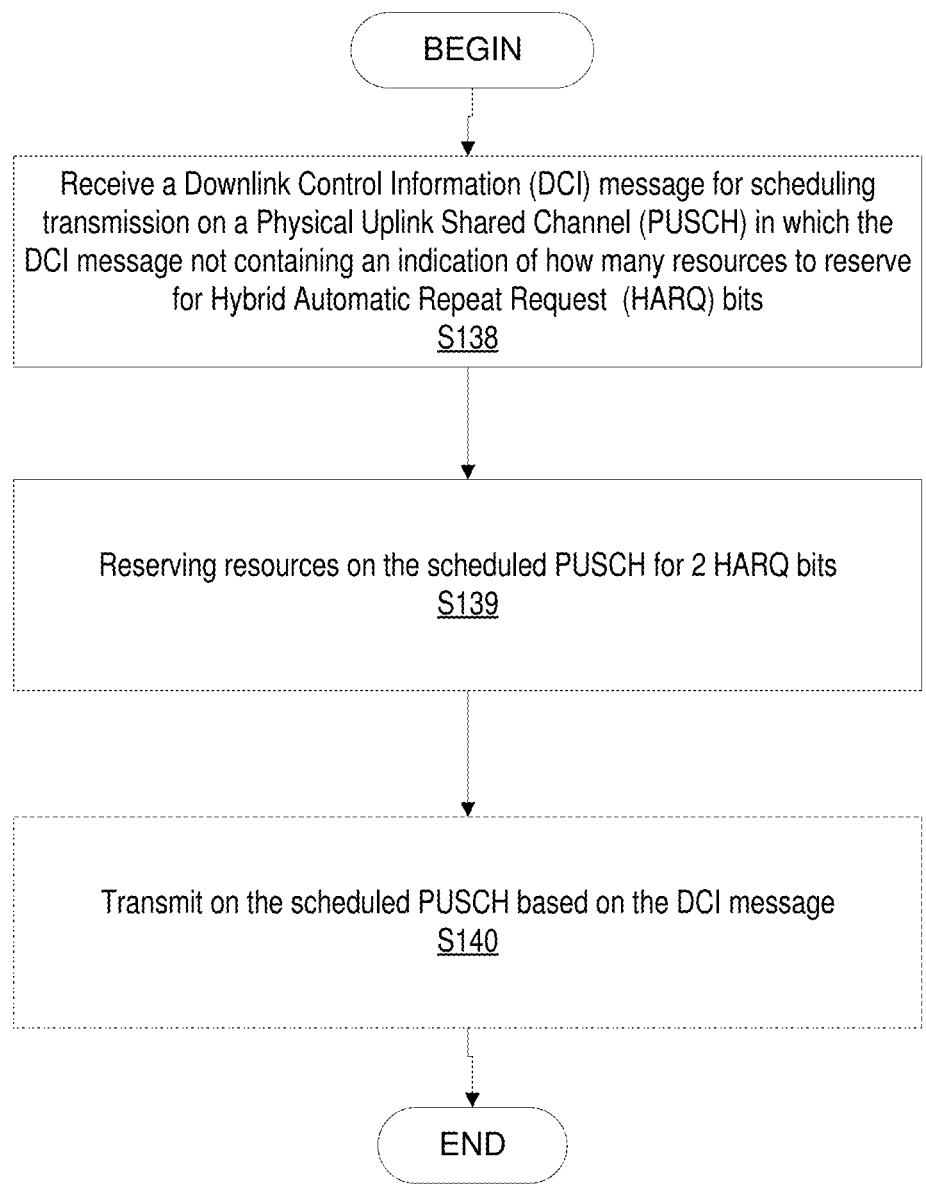
FIG. 11 is a flowchart of an exemplary process in a wireless device for using DCI message for PUSCH according to some embodiments of the present disclosure.

FIG. 11 is a flowchart of an exemplary process in a wireless device 22 using DCI message for PUSCH according to some embodiments of the present disclosure. Processing circuitry 84 is configured to receive a Downlink Control Information (DCI) message for scheduling transmission on a Physical Uplink Shared Channel (PUSCH) in which the DCI message not containing an indication of how many resources to reserve for Hybrid Automatic Repeat Request (HARQ) bits (block S138). Processing circuitry 84 is further configured to reserving resources on the scheduled PUSCH for 2 HARQ bits (block S139). Processing circuitry 84 is further configured to, optionally, transmit on the scheduled PUSCH based on the DCI message (block S140).

In one or more embodiments, the DCI message not containing the indication of how many resources to reserve for HARQ bits corresponds to the DCI message not indicating an uplink (UL) downlink assignment index (DAI). In one or more embodiments in which the DCI message is of DCI format 0_0. In one or more embodiments, the transmission on the scheduled PUSCH is configured to not include Channel State Information (CSI) in the transmission. In one or more embodiments, the transmission includes reserving sources on the PUSCH for at least one Hybrid Automatic Repeat Request (HARQ) bit if the WD has Channel State Information (CSI) to report. In one or more embodiments, processing circuitry 84 is configured to reserve resources on the scheduled PUSCH for 1 Hybrid Automatic Repeat Request (HARQ) bit or 2 HARQ bits.

In one or more embodiments, the transmission on the scheduled PUSCH includes mapping a first part of Channel State Information (CSI) to predefined portion of the scheduled PUSCH. In one or more embodiments, the predefined portion of the scheduled PUSCH corresponds to an end portion of the scheduled PUSCH.

Figure 12:
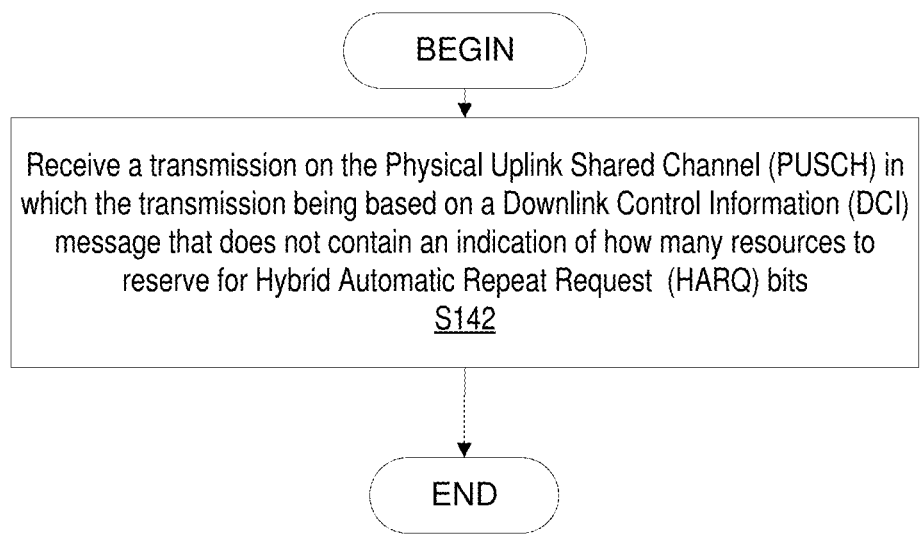
FIG. 12 is a flowchart of an exemplary process in a network node receiving PUSCH transmission according to some embodiments of the present disclosure.

FIG. 12 is a flowchart of an exemplary process in a network node 16 according to some embodiments of the present disclosure. Processing circuitry 68 is configured to receive a transmission on the Physical Uplink Shared Channel (PUSCH) in which the transmission being based on a Downlink Control Information (DCI) message that does not contain an indication of how many resources to reserve for Hybrid Automatic Repeat Request (HARQ) bits (block S142). In one or more embodiments, the DCI message not containing the indication of how many resources to reserve for HARQ bits corresponds to the DCI message not indicating an uplink (UL) downlink assignment index (DAI). In one or more embodiments, the DCI message is of DCI format 0_0.

Figure 13:
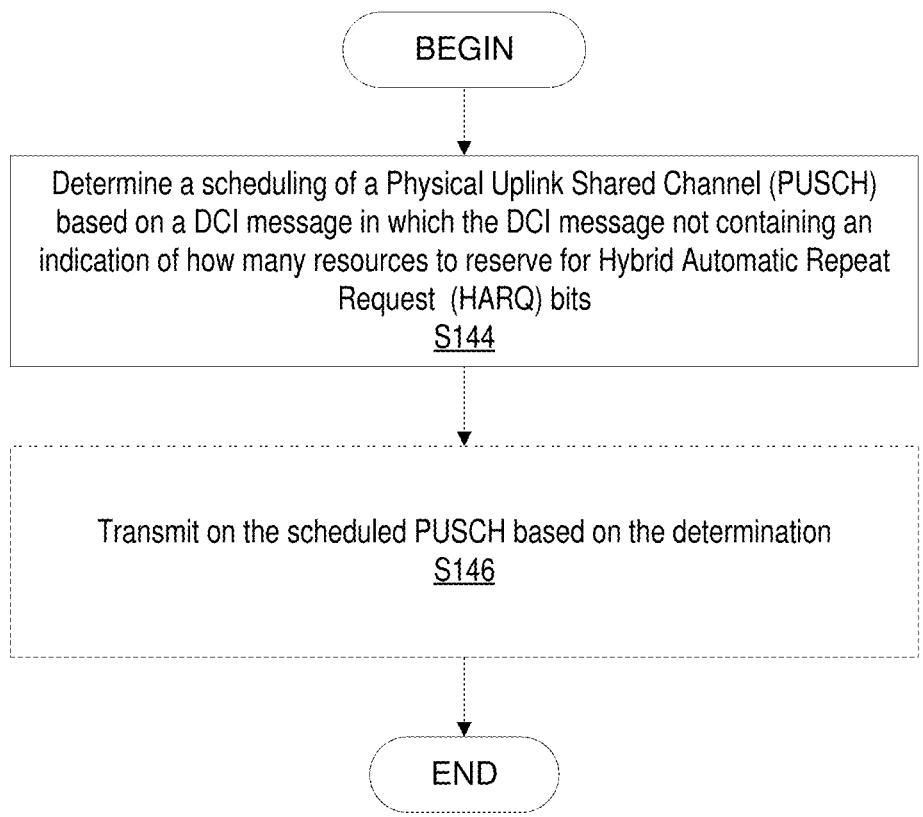
FIG. 13 is a flowchart of an exemplary process in a wireless device for transmitting on the scheduled PUSCH according to some embodiments of the present disclosure.
Figure 14:
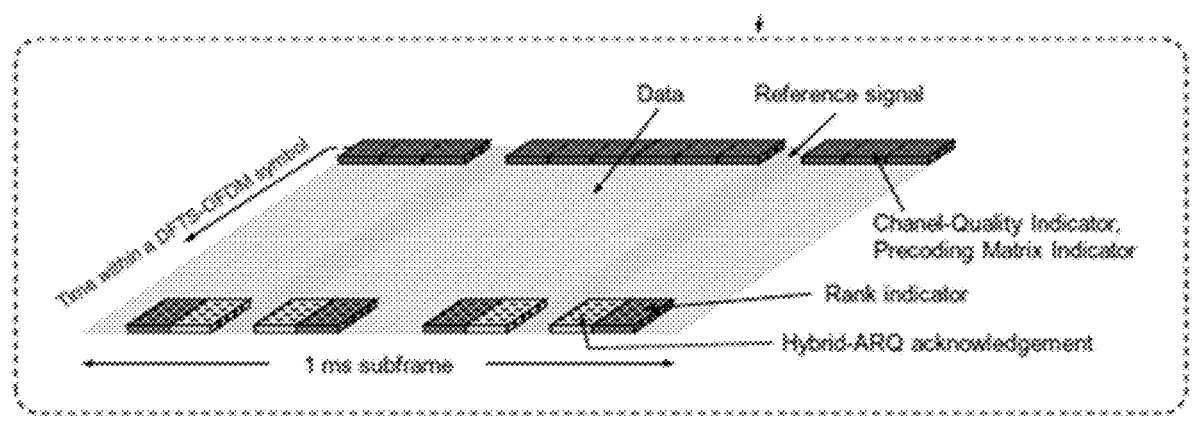
FIG. 14 is a block diagram of uplink control information mapping.
Figure 15:
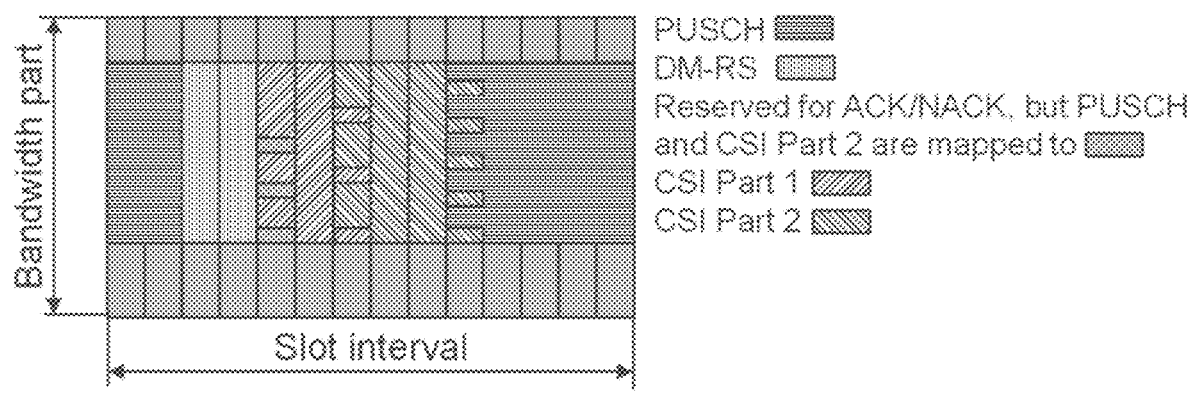
FIG. 15 is block diagram of punctured acknowledgement/negative acknowledgement.

FIG. 13 is a flowchart of an exemplary process in a wireless device 22 according to some embodiments of the present disclosure. Processing circuitry 84 is configured to determine a scheduling of a Physical Uplink Shared Channel (PUSCH) based on a DCI message in which the DCI message does not contain an indication of how many resources to reserve for Hybrid Automatic Repeat Request (HARQ) bits (block S144). Processing circuitry 84 is further configured to, optionally, transmit on the scheduled PUSCH based on the determination (block S146).

In one or more embodiments, the DCI message not containing the indication of how many resources to reserve for HARQ bits corresponds to the DCI message not indicating an uplink (UL) downlink assignment index (DAI). In one or more embodiments in which the DCI message is of DCI format 0_0. In one or more embodiments, the transmission on the scheduled PUSCH does not include Channel State Information (CSI) in the transmission, i.e., is configured not to includes CSI. In one or more embodiments, the transmission on the scheduled PUSCH includes reserving sources on the PUSCH for at least one Hybrid Automatic Repeat Request (HARQ) bit if the WD has Channel State Information (CSI) to report. In one or more embodiments, processing circuitry 84 is configured to reserve resources on the scheduled PUSCH for 1 Hybrid Automatic Repeat Request (HARQ) bit or 2 HARQ bits.

In one or more embodiments, the transmission on the scheduled PUSCH includes mapping a first part of Channel State Information (CSI) to predefined portion of the scheduled PUSCH. In one or more embodiments, the predefined portion of the scheduled PUSCH corresponds to an end portion of the scheduled PUSCH.

Embodiments provide avoiding data loss on the PUSCH due to periodic CSI and missed DL assignments on PUSCH that have been scheduled by fallback DCI. In one or more embodiments, the CSI is not multiplexed (i.e., drop) on PUSCH if the PUSCH is scheduled by a fallback DCI, i.e., DCI format 0_0. Therefore, the disclosure advantageously helps prevent data loss on PUSCH. Embodiments are further described below.

In one embodiment, the WD 22 may always drop a (periodic or semi-persistent) CSI/CSI report if the CSI is supposed to be multiplexed on a PUSCH transmission when the PUSCH transmission was scheduled by a fallback DCI message. A fallback DCI message may include, for example, a DCI message of DCI format 0_0. Further, in one or more embodiments, a fallback DCI message refers to a DCI message that does not contain any indication about how many resources should be reserved for HARQ-ACK bits. In one or more embodiments, such a fallback DCI message corresponds to a DCI message without UL downlink assignment index (DAI) contained in the UL grant.

In one or more embodiments, the fallback DCI in NR does not include a CSI request field and the only CSI that could be included in a PUSCH scheduled by the fallback DCI is periodic or semi-persistent CSI, which have been configured for transmission on Physical Uplink Control Channel (PUCCH), but where the PUCCH resource collide with a scheduled PUSCH and so the CSI is piggybacked on the PUSCH. In one or more embodiments, if the fallback DCI contains a CSI request field, the same problem could occur with an aperiodic CSI report. In short, for PUSCH transmissions scheduled by fallback DCI (e.g., Format 0_0)(or DCI format without UL DAI), the WD 22 does not include a CSI report.

In another embodiment, an assumption is made that the WD 22 reserves resources on PUSCH for either 1 or 2 HARQ-ACK bits (which can be specified or configured) so as to account for the largest/typical possible HARQ-ACK bits, independent from if and how many (1 or 2) HARQ-ACK bits the WD 22 has to transmits. For example, this embodiment may apply for the case where the WD 22 is scheduled with a DCI format for PUSCH without DAI field and the WD 22 has CSI to report, e.g., for example DCI format 0_0.

In yet another embodiment, a different mapping is implemented, either: (1) only when PUSCH is scheduled with a fallback DCI (or DCI without UL DAI)(potentially also conditioned on the number of received DL assignments: if the WD 22 reports more than 2 AN bits PUSCH is rate matched around AN, in this case the current CSI mapping could be assumed) or (2) always (i.e., irrespective of the DCI format scheduling PUSCH), where in (1) or (2), the CSI part1 is mapped at the end (i.e., end portion) of PUSCH. In this embodiment, CSI part 1 would not move around depending on the amount of reserved resources and thus also PUSCH mapping would not change.

In yet another embodiment of the disclosure, the network node 16 implementation avoids scheduling the WD 22 with PUSCH transmission by a DCI message without a DAI field (i.e., with a fallback DCI) in case the WD 22 has a periodic CSI report occasion and has been scheduled with PDSCH requiring 1 or 2 HARQ-ACK bits to report. In yet another embodiment of the disclosure, the network node 16 implementation applies a dual decoding scheme where the network node 16 attempts to decode PUSCH assuming no HARQ-ACK bits are present or HARQ-ACK bit(s) are present. Note that there are two lengths of the HARQ-ACK bits payload, potentially one for 1 bit and one for 2 bits. This embodiment can result in a total of three decoding attempts.

Therefore, one or more embodiments of the disclosure advantageously provides for, if PUSCH is scheduled with a fallback DCI (or a DCI that does not contain an UL DAI), CSI to be dropped to avoid lost PUSCH, caused by missed DL detections.

Further, one or more embodiments of the disclosure solve at least one of the problems with existing systems by providing for one or more embodiments for avoiding data loss on the PUSCH due to periodic CSI and missed DL assignments on PUSCH that have been scheduled by fallback DCI. In one or more embodiments, the CSI is not multiplexed (i.e., drop) on PUSCH if the PUSCH is scheduled by a fallback DCI, i.e., DCI format 0_0. Therefore, the disclosure advantageously helps prevent data loss on PUSCH.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
ACK/NACK Acknowledgment/Not-acknowledgment
CQI Channel Quality Information
CSI Channel State Information
DFTS-OFDM Discrete Fourier Transform Spread OFDM
DM-RS Demodulation Reference Signal
PMI Precoder Matrix Index
OFDM Orthogonal Frequency Division Multiplex
PUSCH Physical Uplink Shared Channel
RI Rank Indicator
RRC Radio Resource Control
SRS Sounding Reference Signal
UCI Uplink Control Information It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Some Embodiments include:

Embodiment A1. A network node configured to communicate with a wireless device (WD), the network node configured to, and/or comprising a radio interface and/or comprising processing circuitry configured to:
  schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits; and
  optionally, transmit the DCI message to the wireless device.

Embodiment A2. The network node of Embodiment A1, wherein the DCI message not containing the indication of how many resources to reserve for HARQ bits corresponds to the DCI message not indicating an uplink (UL) downlink assignment index (DAI).

Embodiment A3. The network node of Embodiment A1, wherein the DCI message is of DCI format 0_0.

Embodiment B1. A communication system including a host computer, the host computer comprising:
  processing circuitry configured to provide user data; and
  a communication interface configured to forward the user data to a cellular network for transmission to a wireless device (WD),
  the cellular network comprising a network node having a radio interface and processing circuitry, the network node configured to, and/or the network node's processing circuitry configured to:
  schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits; and
  optionally, transmit the DCI message to the wireless device.

Embodiment B2. The communication system of Embodiment B1, further including the network node.

Embodiment B3. The communication system of Embodiment B2, further including the WD, wherein the WD is configured to communicate with the network node.

Embodiment B4. The communication system of Embodiment B3, wherein:
  the processing circuitry of the host computer is configured to execute a host application, thereby providing the user data; and
  the WD comprises processing circuitry configured to execute a client application associated with the host application.

Embodiment C1. A method implemented in a network node, the method comprising
  schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits; and
  optionally, transmitting the DCI message to the wireless device.

Embodiment C2. The method of Embodiment C1, wherein the DCI message not containing the indication of how many resources to reserve for HARQ bits corresponds to the DCI message not indicating an uplink (UL) downlink assignment index (DAI).

Embodiment C3. The method of Embodiment C1, wherein the DCI message is of DCI format 0_0.

Embodiment D1. A method implemented in a communication system including a host computer, a network node and a wireless device (WD), the method comprising:
  at the host computer, providing user data; and
  at the host computer, initiating a transmission carrying the user data to the WD via a cellular network comprising the network node, wherein the network node:
    schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits; and
    transmits the DCI message to the wireless device.

Embodiment D2. The method of Embodiment D1, further comprising, at the network node, transmitting the user data.

Embodiment D3. The method of Embodiment D2, wherein the user data is provided at the host computer by executing a host application, the method further comprising, at the WD, executing a client application associated with the host application.

Embodiment E1. A wireless device (WD) configured to communicate with a network node, the WD configured to, and/or comprising a radio interface and/or processing circuitry configured to:
  receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits; and optionally, transmit on the scheduled PUSCH based on the DCI message.

Embodiment E2. The WD of Embodiment E1, wherein the DCI message not containing the indication of how many resources to reserve for HARQ bits corresponds to the DCI message not indicating an uplink (UL) downlink assignment index (DAI).

Embodiment E3. The WD of Embodiment E1, wherein the DCI message is of DCI format 0_0.

Embodiment E4. The WD of Embodiment E1, wherein transmission on the scheduled PUSCH includes does not include Channel State Information (CSI) in the transmission.

Embodiment E5. The WD of Embodiment E1, wherein the transmission on the scheduled PUSCH includes reserving sources on the PUSCH for at least one Hybrid Automatic Repeat Request (HARQ) bit if the WD has Channel State Information (CSI) to report.

Embodiment E6. The WD of Embodiment E1, wherein transmission on the scheduled PUSCH includes mapping a first part of Channel State Information (CSI) to predefined portion of the scheduled PUSCH.

Embodiment E7. The WD of Embodiment E6, wherein the predefined portion of the scheduled PUSCH corresponds to an end portion of the scheduled PUSCH.

Embodiment E8. The WD of embodiment E1, wherein the WD configured to, and/or comprising a radio interface and/or processing circuitry is configured to reserve resources on the scheduled PUSCH for 1 Hybrid Automatic Repeat Request (HARQ) bit or 2 HARQ bits.

Embodiment F1. A communication system including a host computer, the host computer comprising:
processing circuitry configured to provide user data; and
a communication interface configured to forward user data to a cellular network for transmission to a wireless device (WD),
the WD configured to, and/or comprising a radio interface and/or processing circuitry configured to:
receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits; and
optionally, transmit on the scheduled PUSCH based on the DCI message.

Embodiment F2. The communication system of Embodiment F1, further including the WD.

Embodiment F3. The communication system of Embodiment F2, wherein the cellular network further includes a network node configured to communicate with the WD.

Embodiment F4. The communication system of Embodiment F2 or F3, wherein:
the processing circuitry of the host computer is configured to execute a host application, thereby providing the user data; and
the WD's processing circuitry is configured to execute a client application associated with the host application.

Embodiment G1. A method implemented in a wireless device (WD), the method comprising:
receiving a Downlink Control Information (DCI) message for scheduling transmission on a Physical Uplink Shared Channel (PUSCH), the DCI message not containing an indication of how many resources to reserve for Hybrid Automatic Repeat Request (HARQ) bits; and
optionally, transmit on the scheduled PUSCH based on the DCI message.

Embodiment G2. The method of Embodiment G1, wherein the DCI message not containing the indication of how many resources to reserve for HARQ bits corresponds to the DCI message not indicating an uplink (UL) downlink assignment index (DAI).

Embodiment G3. The method of Embodiment G1, wherein the DCI message is of DCI format 0_0.

Embodiment G4. The method of Embodiment G1, wherein the transmission on the scheduled PUSCH does not include Channel State Information (CSI) in the transmission.

Embodiment G5. The method of Embodiment G1, wherein the transmission on the scheduled PUSCH includes reserving sources on the scheduled PUSCH for at least one Hybrid Automatic Repeat Request (HARQ) bit if the WD has Channel State Information (CSI) to report.

Embodiment G6. The method of Embodiment G1, wherein the transmission on the scheduled PUSCH includes mapping a first part of Channel State Information (CSI) to predefined portion of the scheduled PUSCH.

Embodiment G7. The method of Embodiment G6, wherein the predefined portion of the scheduled PUSCH corresponds to an end portion of the scheduled PUSCH.

Embodiment G8. The method of Embodiment G1, further comprising reserving resources on the scheduled PUSCH for 1 Hybrid Automatic Repeat Request (HARQ) bit or 2 HARQ bits.

Embodiment H1. A method implemented in a communication system including a host computer, a network node and a wireless device (WD), the method comprising:
at the host computer, providing user data; and
at the host computer, initiating a transmission carrying the user data to the WD via a cellular network comprising the network node, wherein the WD:
receives a Downlink Control Information (DCI) message for scheduling Physical Uplink Shared Channel (PUSCH), the DCI message not containing an indication of how many resources to reserve for Hybrid Automatic Repeat Request (HARQ) bits; and
optionally, transmit on the PUSCH based on the DCI message.

Embodiment H2. The method of Embodiment 35, further comprising, at the WD, receiving the user data from the network node.

Embodiment I1. A wireless device (WD) configured to communicate with a network node, the WD configured to, and/or comprising a radio interface and/or processing circuitry configured to:
determine a scheduling of a Physical Uplink Shared Channel (PUSCH) based on a DCI message, the DCI message not containing an indication of how many resources to reserve for Hybrid Automatic Repeat Request (HARQ) bits; and
optionally, transmit on the scheduled PUSCH based on the determination.

Embodiment I2. The wireless device of Embodiment I1, wherein the DCI message not containing the indication of how many resources to reserve for HARQ bits corresponds to the DCI message not indicating an uplink (UL) downlink assignment index (DAI).

Embodiment I3. The wireless device of Embodiment I1, wherein the DCI message is of DCI format 0_0.

Embodiment I4. The wireless device of Embodiment I1, wherein the transmission on the scheduled PUSCH does not include Channel State Information (CSI) in the transmission.

Embodiment I5. The wireless device of Embodiment I1, wherein the transmission on the scheduled PUSCH includes reserving sources on the scheduled PUSCH for at least one Hybrid Automatic Repeat Request (HARQ) bit if the WD has Channel State Information (CSI) to report.

Embodiment I6. The wireless device of Embodiment I1, wherein transmission on the scheduled PUSCH includes mapping a first part of Channel State Information (CSI) to predefined portion of the scheduled PUSCH.

Embodiment I7. The wireless device of Embodiment I6, wherein the predefined portion of the scheduled PUSCH corresponds to an end portion of the scheduled PUSCH.

Embodiment I8. The wireless device of Embodiment I1, wherein the WD configured to, and/or comprising a radio interface and/or processing circuitry is configured to reserve resources on the scheduled PUSCH for 1 Hybrid Automatic Repeat Request (HARQ) bit or 2 HARQ bits.

Embodiment J1. A communication system including a host computer, the host computer comprising:
  a communication interface configured to receive user data originating from a transmission from a wireless device (WD) to a network node,
  the WD configured to, and/or comprising a radio interface and/or processing circuitry configured to:
  determine a scheduling of a Physical Uplink Shared Channel (PUSCH) based on a DCI message, the DCI message not containing an indication of how many resources to reserve for Hybrid Automatic Repeat Request (HARQ) bits; and
  optionally, transmit on the scheduled PUSCH based on the determination.

Embodiment J2. The communication system of Embodiment J1, further including the WD.

Embodiment J3. The communication system of Embodiment J2, further including the network node, wherein the network node is configured to, and/or comprises a radio interface configured to communicate with the WD and a communication interface configured to forward to the host computer the user data carried by a transmission from the WD to the network node.

Embodiment J4. The communication system of Embodiment J2 or J3, wherein:
  the processing circuitry of the host computer is configured to execute a host application; and
  the WD's processing circuitry is configured to execute a client application associated with the host application, thereby providing the user data.

Embodiment J5. The communication system of Embodiment J2 or J3, wherein:
  the processing circuitry of the host computer is configured to execute a host application, thereby providing request data; and
  the WD's processing circuitry is configured to execute a client application associated with the host application, thereby providing the user data in response to the request data.

Embodiment K1. A method implemented in a wireless device (WD), the method comprising:
  determining a scheduling of a Physical Uplink Shared Channel (PUSCH) based on a DCI message, the DCI message not containing an indication of how many resources to reserve for Hybrid Automatic Repeat Request (HARQ) bits; and
  optionally, transmitting on the scheduled PUSCH based on the determination.

Embodiment K2. The method of Embodiment K1, wherein the DCI message not containing the indication of how many resources to reserve for HARQ bits corresponds to the DCI message not indicating an uplink (UL) downlink assignment index (DAI).

Embodiment K3. The method of Embodiment K1, wherein the DCI message is of DCI format 0_0.

Embodiment K4. The method of Embodiment K1, wherein the transmission on the scheduled PUSCH does not include Channel State Information (CSI) in the transmission.

Embodiment K5. The method of Embodiment K1, wherein the transmission on the scheduled PUSCH includes reserving sources on the scheduled PUSCH for at least one Hybrid Automatic Repeat Request (HARQ) bit if the WD has Channel State Information (CSI) to report.

Embodiment K6. The method of Embodiment K1, wherein the transmission on the scheduled PUSCH includes mapping a first part of Channel State Information (CSI) to predefined portion of the scheduled PUSCH.

Embodiment K7. The method of Embodiment K1, wherein the predefined portion of the scheduled PUSCH corresponds to an end portion of the scheduled PUSCH.

Embodiment K8. The method of Embodiment K1, further comprising:
  providing user data; and
  forwarding the user data to a host computer via the transmission to the network node.

Embodiment K9. The method of Embodiment K1, further comprising reserving resources on the scheduled PUSCH for 1 Hybrid Automatic Repeat Request (HARQ) bit or 2 HARQ bits.

Embodiment L1. A method implemented in a communication system including a host computer, a network node and a wireless device (WD), the method comprising:
  at the host computer, receiving user data transmitted to the network node from the WD, wherein the WD:
  determines a scheduling of a Physical Uplink Shared Channel (PUSCH) based on a DCI message, the DCI message not containing an indication of how many resources to reserve for Hybrid Automatic Repeat Request (HARQ) bits; and
  optionally, transmits on the scheduled PUSCH based on the determination.

Embodiment L2. The method of Embodiment L1, further comprising, at the WD, providing the user data to the network node.

Embodiment L3. The method of Embodiment L2, further comprising:
  at the WD, executing a client application, thereby providing the user data to be transmitted; and
  at the host computer, executing a host application associated with the client application.

Embodiment L4. The method of Embodiment L2, further comprising:
  at the WD, executing a client application; and
  at the WD, receiving input data to the client application, the input data being provided at the host computer by executing a host application associated with the client application,
  wherein the user data to be transmitted is provided by the client application in response to the input data.

Embodiment M1. A network node configured to communicate with a wireless device (WD), the network node configured to, and/or comprising a radio interface and/or processing circuitry configured to:

receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Embodiment M2. The network node of Embodiment M1, wherein the DCI message not containing the indication of how many resources to reserve for HARQ bits corresponds to the DCI message not indicating an uplink (UL) downlink assignment index (DAI).

Embodiment M3. The network node of Embodiment M1, wherein the DCI message is of DCI format 0_0.

Embodiment N1. A communication system including a host computer, the host computer comprising: a communication interface configured to receive user data originating from a transmission from a wireless device (WD) to a network node, the network node configured to, and/or comprising a radio interface and/or processing circuitry configured to receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Embodiment N2. The communication system of Embodiment N1, further including the network node.

Embodiment N3. The communication system of Embodiment N2, further including the WD, wherein the WD is configured to communicate with the network node.

Embodiment N4. The communication system of Embodiment N3, wherein:
the processing circuitry of the host computer is configured to execute a host application; and
the WD is configured to execute a client application associated with the host application, thereby providing the user data to be received by the host computer.

Embodiment O1. A method implemented in a network node, the method comprising receiving a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Embodiment O2. The method of Embodiment O1, wherein the DCI message not containing the indication of how many resources to reserve for HARQ bits corresponds to the DCI message not indicating an uplink (UL) downlink assignment index (DAI).

Embodiment O3. The method of Embodiment O1, wherein the DCI message is of DCI format 0_0.

Embodiment P1. A method implemented in a communication system including a host computer, a network node and a wireless device (WD), the method comprising:
at the host computer, receiving, from the network node, user data originating from a transmission which the network node has received from the WD, wherein the network node receives a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Embodiment P2. The method of Embodiment P1, further comprising, at the network node, receiving the user data from the WD.

Embodiment P3. The method of Embodiment P2, further comprising, at the network node, initiating a transmission of the received user data to the host computer.

Embodiment Q1. A network node, comprising:
a determination module configured to schedule the wireless device on a Physical Uplink Shared Channel (PUSCH) using a Downlink Control Information (DCI) message, the DCI message not containing an indication of how many resources to reserve for Hybrid Automatic Repeat Request (HARQ) bits; and
a transmission module configured to transmit the DCI message to the wireless device.

Embodiment Q2. A network node, comprising:
reception module configured to receive a transmission on the Physical Uplink Shared Channel (PUSCH), the transmission being based on a Downlink Control Information (DCI) message that does not contain an indication of how many resources to reserve for Hybrid Automatic Repeat Request (HARQ) bits.

Embodiment Q3. A wireless device, comprising:
a receiving module configured to receive a Downlink Control Information (DCI) message for scheduling transmission on a Physical Uplink Shared Channel (PUSCH), the DCI message not containing an indication of how many resources to reserve for Hybrid Automatic Repeat Request (HARQ) bits; and
a determining module configured to transmit on the scheduled PUSCH based on the DCI message.

Embodiment Q4. A wireless device, comprising:
a determining module configured to determine a scheduling of a Physical Uplink Shared Channel (PUSCH) based on a DCI message, the DCI message not containing an indication of how many resources to reserve for Hybrid Automatic Repeat Request (HARQ) bits; and
a transmitting module configured to transmit on the scheduled PUSCH based on the determination.

STANDARDIZING THE PROPOSED SOLUTIONS

The attached Appendix provides non-limiting examples of how certain aspects of the proposed solutions could be implemented within the framework of a specific communication standard. In particular, the attached Appendix provides non-limiting examples of how the proposed solutions could be implemented within the framework of a 3GPP TSG RAN standard. The changes described by the Appendix are merely intended to illustrate how certain aspects of the proposed solutions could be implemented in a particular standard. However, the proposed solutions could also be implemented in other suitable manners, both in the 3GPP Specification and in other specifications or standards.

| | |
|---|---|
| Agenda Item: | 7.3.2.3 |
| Source: | Ericsson |
| Title: | On Mapping of UCI on PUSCH and Other Issues |
| Document for: | Discussion and Decision |

1   INTRODUCTION

The following agreements with respect to UCI on PUSCH are made in the previous meetings:
RAN1 #90
Agreements: (referred to as Agreement C later in the text)
- For frequency first mapping, UCI resource mapping principles (e.g., around RS) are common for PUSCH with DFT-s-OFDM waveform and CP-OFDM waveform
- At least for periodic CSI report configured by RRC and aperiodic CSI report triggered by UL grant, the UL data is rate-matched around the UCI

Working assumptions:
> For slot-based scheduling, for HARQ-ACK with more than 2 bits, PUSCH is rate-matched.
> For slot-based scheduling, for HARQ-ACK with up to 2 bits, PUSCH is punctured.
> Note: NR ensures sufficiently reliable common understanding on HARQ-ACK bits between gNB and UE.

RAN1 NR AdHoc #3
Agreements:
- Confirm the working assumption:
  - For slot-based scheduling, for HARQ-ACK with more than 2 bits, PUSCH is rate-matched.
  - For slot-based scheduling, for HARQ-ACK with up to 2 bits, PUSCH is punctured.

RAN1 #90bis

Agreements:
- For ACK piggybacked on PUSCH, map ACK to distributed REs across PUSCH allocated RBs
    - Details FFS Agreements:
- For CSI piggybacked on PUSCH, map CSI to distributed REs across PUSCH allocated RBs
    - Details FFS Agreements:
- For CSI piggybacked on PUSCH, support splitting CSI mapping (at least for some CSI) into two parts, where the two parts are mapped differently
    - FFS details (e.g., grouping of different CSI types and map them into different REs, which types of CSI, etc.)
    - FFS impact of frequency hopping (if any)

Agreements (email):
- When HARQ-ACK piggyback on PUSCH, the same rule is applied to map encoded HARQ-ACK bits to HARQ-ACK REs, regardless of HARQ-ACK puncture or rate match PUSCH.
    - HARQ-ACK avoids puncturing PT-RS.
    - Down select to one from the following two alternatives
        - MAP HARQ-ACK to REs around DMRS symbol(s)
        - Map HARQ-ACK to REs across as many symbols within PUSCH (excluding DMRS symbol) as possible in both frequency hops if applicable.

Agreements:
- If freq hop is disabled for PUSCH, CSI piggybacked on PUSCH follows freq first mapping rule
    - FFS details
- FFS the case when hopping is enabled

RAN1 #91

Agreements:
- If frequency hopping for PUSCH is enabled, the N1 modulation symbols of HARQ-ACK are partitioned into HARQ-ACK part A and HARQ-ACK part B, where part A has floor(N1/2) and part B has ceiling(N1/2) modulation symbols. HARQ-ACK part A is mapped to the first hop. HARQ-ACK part B is mapped to the second hop.
- If frequency hopping for PUSCH is enabled, the N2 modulation symbols of CSI part 1 are partitioned into CSI part 1A and CSI part 1B, where part 1A has floor(N2/2) and part 1B has ceiling(N2/2) modulation symbols. CSI part 1A is mapped to the first hop. CSI part 1B is mapped to the second hop.
- If frequency hopping for PUSCH is enabled, the N3 modulation symbols of CSI part 2 are partitioned into CSI part 2A and CSI part 2B, where part 2A has floor(N3/2) and part 2B has ceiling(N3/2) modulation symbols. CSI part 2A is mapped to the first hop. CSI part 2B is mapped to the second hop.

Agreements: (referred to as Agreement A later in the text)
- Detail UCI mapping rule on PUSCH is as follows:
  - Map HARQ-ACK to REs around DMRS symbol(s)
  - If PUSCH punctured by HARQ-ACK,
    - Map CSI part 1 starting after certain amount of reserved HARQ-ACK REs.
      - FFS reserved HARQ-ACK REs
      - PUSCH can be mapped to reserved REs
  - If PUSCH rate matched by HARQ-ACK,
    - map HARQ-ACK first, followed by CSI part1.
  - FFS: how to map CSI part 2, e.g.,
    - Map CSI part 2 after CSI part 1
    - Map CSI part 2 after UL_SCH Agreements:
- In Rel-15, both HARQ-ACK and CSI are mapped to all layers of the TB on PUSCH.

Agreements: (referred to as Agreement B later in the text)
- Modulated HARQ-ACK symbols are mapped starting on the first available non-DMRS symbol after the first DMRS symbol(s), regardless of number of DMRS symbols in PUSCH transmission.
- Modulated CSI part 1 symbols are mapped starting on the first available non-DMRS symbol, regardless of number of DMRS symbols in PUSCH transmission.
  - CSI part 1 is not mapped on the reserved HARQ-ACK REs in case of HARQ-ACK puncturing PUSCH
  - CSI part 1 is not mapped on the HARQ-ACK REs in case of HARQ-ACK rate-matching PUSCH.
- Modulated CSI part 2 symbols are mapped starting on the first available non-DMRS symbol, regardless of number of DMRS symbols in PUSCH transmission.
  - CSI part 2 can be mapped on the reserved HARQ-ACK REs in case of HARQ-ACK puncturing PUSCH.
  - CSI part 2 is not mapped on the HARQ-ACK REs in case of HARQ-ACK rate-matching PUSCH.
  - CSI part 2 is not mapped on the CSI part 1 REs.

Working assumption:
- UCI mapping in frequency domain follows the rules below:
  - Given a UCI type, on i-th OFDM symbol, modulated UCI symbols are mapped to REs in a distributed manner with distance d determined as following:
    - $d = 1$, if the number of unmapped modulated symbols for that UCI at the beginning of OFDM symbol i is larger or equal to the number of available REs in this OFDM symbol.
    - $d = $ floor(number available REs on i-th OFDM symbol/the number of unmapped modulated symbols for that UCI at the beginning of OFDM symbol i)

Agreements:

- For aperiodic CSI on PUSCH triggered by an UL grant without UL-SCH data, the modulation order for PUSCH is handled the same way as the case when PUSCH is with UL-SCH data

2  DISCUSSION

2.1  ACK/NACK mapping

Subclause 6.2.7 in [1] maps ACK/NACK to symbols beginning with the first symbol after the DM-RS. For large ACK/NACK codebooks and small PUSCH bandwidth the coded ACK/NACK mapping may continue until an OFDM symbol carrying the next DM-RS. The current mapping maps ACK/NACK coded bits to available RE in DM-RS carrying symbols, since the iterator $l$ in Step 2 runs across all OFDM symbols. According to Agreement A ACK/NACK should be mapped to non-DM-RS symbols (*Map HARQ-ACK to REs around DMRS symbol(s)*).

2.2  CSI mapping

The mapping of CSI in Subclause 6.2.7 of [1] maps CSI to the first available non-DM-RS symbol, since the iterator $l$ in Step 3 is initialized with the first non-DM-RS symbol. While Agreement B alone could suggest such mapping, the combination of Agreement A and B states that CSI is mapped after first DM-RS symbol(s): From Agreement A follows that CSI is mapped after ACK/NACK (*map HARQ-ACK first, followed by CSI part1*; FFS: *how to map CSI part 2, e.g., Map CSI part 2 after CSI part 1, Map CSI part 2 after UL_SCH*). From Agreement B follows that ACK/NACK is mapped after first DM-RS symbol(s) (*Modulated HARQ-ACK symbols are mapped starting on the first available non-DMRS symbol after the first DMRS symbol(s)*). From combining these two agreements follows that CSI mapping starts after ACK/NACK mapping (this does not preclude CSI mapping to last OFDM symbol carrying ACK/NACK if RE are available).

The combination of Agreements A and B alone does not preclude the mapping of CSI onto later DM-RS symbols and the current CSI mapping also maps CSI to DM-RS symbols (iterator $l$ in Step 3 runs across all OFDM symbols). However, this is not the intention of Agreement A and B, it needs to be considered with Agreement C (*For frequency first mapping, UCI resource mapping principles (e.g., around RS) are common for PUSCH with DFT-s-OFDM waveform and CP-OFDM waveform*): For OFDM, mapping of CSI to empty RE in DM-RS symbols is possible, for DFTS-OFDM not, thus mapping of CSI to DM-RS symbols violates Agreement C.

Proposal 1:
  Update Subclause 6.2.7 of [1] to
  1. Map ACK/NACK only to non-DM-RS symbols
  2. CSI mapping starts in last (or next non-DM-RS symbol, depending on RE availability) OFDM symbol carrying ACK/NACK
  3. CSI is not mapped to DM-RS symbols Based on the discussion here, Subclause 6.2.7 in 38.212 is proposed to be modified. An according TP can be found in Section 3.

2.3 Determination of number of reserved RE for punctured ACK/NACK

So far no agreement has been reached how to determine the amount of reserved resources for punctured ACK/NACK. In principal a very similar(same) formula can be used as with rate-matched AN, i.e.

$$Q'_{ACK} = \min\left\{ \left\lceil \frac{(O_{ACK}+L)\cdot M_{sc}^{PUSCH}\cdot N_{symb}^{PUSCH}\cdot \beta_{offset}^{PUSCH}}{\sum_{r=0}^{C_{UL-SCH}-1} K_r} \right\rceil, \sum_{l=0}^{N_{symb,all}^{PUSCH}-1} M_{sc}^{\Phi^{UCI}}(l) \right\}$$

The number of ACK/NACK bits $O_{ACK}$ follows from the DAI in the UL grant.

In the fallback DCI no UL DAI is included. Here, $O_{ACK}$ can be derived from the detected number of DL assignments. If UE misses a DL assignment, it will determine a wrong number of $O_{ACK}$. The fallback DCI is likely to be used for small ACK/NACK payloads and up to 2 bit ACK/NACK is punctured, which should give robustness towards missed DL assignments. For more than 2 bit ACK/NACK is rate matched and a wrong $O_{ACK}$ results in wrong rate matching and lost PUSCH. Given that fallback DCI is mainly used with small ACK/NACK payloads (puncturing) this issue is not so severe.

However, even for small (punctured) ACK/NACK payloads missed DL assignments can lead to lost PUSCH: Depending on $O_{ACK}$ the number of reserved resources is determined. If the UE uses a different $O_{ACK}$ than the gNB the number of reserved resources is different. Since CSI1 is not to mapped to reserved resources gNB and UE assume different CSI1 mapping resulting in lost CSI1. Since PUSCH is rate matched around CSI1, even PUSCH is lost. A simple remedy would be to drop CSI1 in a PUSCH scheduled with fallback DCI. Note, the fallback DCI does not include a CSI request field and the only CSI that could be included in a PUSCH scheduled by the fallback DCI is periodic CSI piggybacked to PUSCH.

Proposal 2:

For PUSCH transmissions scheduled by fallback DCI (Format 0_0), UE does not include a CSI1 report.

---

3 TEXT PROPOSAL

----------------------------------------\<Start of Text Proposal\>----------------------------------------

3.1.1 6.2.7 Data and control multiplexing

Denote the coded bits for UL-SCH as $g_0^{UL-SCH}, g_1^{UL-SCH}, g_2^{UL-SCH}, g_3^{UL-SCH}, \ldots, g_{G^{UL-SCH}-1}^{UL-SCH}$.

Denote the coded bits for HARQ-ACK, if any, as $g_0^{ACK}, g_1^{ACK}, g_2^{ACK}, g_3^{ACK}, \ldots, g_{G^{ACK}-1}^{ACK}$.

Denote the coded bits for CSI part 1, if any, as $g_0^{CSI-part1}, g_1^{CSI-part1}, g_2^{CSI-part1}, g_3^{CSI-part1}, \ldots, g_{G^{CSI-part1}-1}^{CSI-part1}$.

Denote the coded bits for CSI part 2, if any, as $g_0^{CSI-part2}, g_1^{CSI-part2}, g_2^{CSI-part2}, g_3^{CSI-part2}, \ldots, g_{G^{CSI-part2}-1}^{CSI-part2}$.

Denote the multiplexed data and control coded bit sequence as $g_0, g_1, g_2, g_3, \ldots, g_{G-1}$.

Denote $l$ as the OFDM symbol index of the scheduled PUSCH, starting from 0 to $N_{symb,all}^{PUSCH}-1$, where $N_{symb,all}^{PUSCH}$ is the total number of OFDM symbols of the PUSCH, including all OFDM symbols used for DMRS.

Denote $k$ as the subcarrier index of the scheduled PUSCH, starting from 0 to $M_{sc}^{PUSCH}-1$, where $M_{sc}^{PUSCH}$ is the number of subcarriers contained in the scheduled PUSCH.

Denote $\Phi_l$ as the set of resource elements, in ascending order of indices $k$, available for transmission of data or UCI in OFDM symbol $l$, for $l=0,1,2,...,N_{symb,all}^{PUSCH}-1$. Denote $M_{sc}^{\Phi}(l)=|\Phi_l|$ as the number of elements in set $\Phi_l$. Denote $\Phi_l(j)$ as the $j$-th element in $\Phi_l$.

If frequency hopping is configured for the PUSCH,
- denote $l^{(1)}$ as the OFDM symbol index of the first OFDM symbol after the first set of consecutive OFDM symbol(s) carrying DMRS in the first hop;

- denote $l^{(2)}$ as the OFDM symbol index of the first OFDM symbol after the first set of consecutive OFDM symbol(s) carrying DMRS in the second hop.

-

-

- if HARQ-ACK is present for transmission on the PUSCH, let $G^{ACK}(1) = N_L \cdot Q_m \cdot \lfloor G^{ACK}/(2 \cdot N_L \cdot Q_m) \rfloor$ and $G^{ACK}(2) = N_L \cdot Q_m \cdot \lceil G^{ACK}/(2 \cdot N_L \cdot Q_m) \rceil$;

- if CSI is present for transmission on the PUSCH, let $G^{CSI-part1}(1) = N_L \cdot Q_m \cdot \lfloor G^{CSI-part1}/(2 \cdot N_L \cdot Q_m) \rfloor$, $G^{CSI-part1}(2) = N_L \cdot Q_m \cdot \lceil G^{CSI-part1}/(2 \cdot N_L \cdot Q_m) \rceil$, $G^{CSI-part2}(1) = N_L \cdot Q_m \cdot \lfloor G^{CSI-part2}/(2 \cdot N_L \cdot Q_m) \rfloor$, and $G^{CSI-part2}(2) = N_L \cdot Q_m \cdot \lceil G^{CSI-part2}/(2 \cdot N_L \cdot Q_m) \rceil$;

- let $N_{hop}^{PUSCH}=2$, and denote $N_{symb,hop}^{PUSCH}(1)$, $N_{symb,hop}^{PUSCH}(2)$ as the number of OFDM symbols of the PUSCH in the first and second hop, respectively;

- $N_L$ is the number of transmission layers of the PUSCH;

- $Q_m$ is the modulation order of the PUSCH.

If frequency hopping is not configured for the PUSCH,
- denote $l^{(1)}$ as the OFDM symbol index of the first OFDM symbol after the first set of consecutive OFDM symbol(s) carrying DMRS;

-

- if HARQ-ACK is present for transmission on the PUSCH, let $G^{ACK}(1) = G^{ACK}$;

- if CSI is present for transmission on the PUSCH, let $G^{CSI-part1}(1) = G^{CSI-part1}$ and $G^{CSI-part2}(1) = G^{CSI-part2}$;

- let $N_{hop}^{PUSCH}=1$ and $N_{symb,hop}^{PUSCH}(1) = N_{symb,all}^{PUSCH}$.

The multiplexed data and control coded bit sequence $g_0, g_1, g_2, g_3, ..., g_{G-1}$ is obtained according to the following:

Step 1:

Set $\overline{\Phi}_l = \Phi_l$ for $l = 0, 1, 2, ..., N_{\text{symb,all}}^{\text{PUSCH}} - 1$;

Set $\overline{M}_{\text{sc}}^{\Phi}(l) = |\overline{\Phi}_l|$ for $l = 0, 1, 2, ..., N_{\text{symb,all}}^{\text{PUSCH}} - 1$;

if HARQ-ACK is present for transmission on the PUSCH and the number of HARQ-ACK information bits is no more than 2 denote $\overline{\Phi}_l^{\text{rvd}}$ as the set of reserved resource elements for potential HARQ-ACK transmission, in OFDM symbol $l$, for $l = 0, 1, 2, ..., N_{\text{symb,all}}^{\text{PUSCH}} - 1$;

denote $\overline{M}_{\text{sc,rvd}}^{\Phi}(l) = |\overline{\Phi}_l^{\text{rvd}}|$ as the number of elements in $\overline{\Phi}_l^{\text{rvd}}$;

else $$\overline{\Phi}_l^{\text{rvd}} = \varnothing \text{ for } l = 0, 1, 2, ..., N_{\text{symb,all}}^{\text{PUSCH}} - 1;$$

$$\overline{M}_{\text{sc,rvd}}^{\Phi}(l) = 0 \text{ for } l = 0, 1, 2, ..., N_{\text{symb,all}}^{\text{PUSCH}} - 1;$$

end if

Step 2:

if HARQ-ACK is present for transmission on the PUSCH and the number of HARQ-ACK information bits is more than 2, Set $m_{\text{count}}^{\text{ACK}}(1) = 0$;

Set $m_{\text{count}}^{\text{ACK}}(2) = 0$;

Set $m_{\text{count,all}}^{\text{ACK}} = 0$;

for $i = 0$ to $N_{\text{hop}}^{\text{PUSCH}} - 1$ $l = l^{(i)}$;

while $m_{\text{count}}^{\text{ACK}}(i) < G^{\text{ACK}}(i)$ if $G^{\text{ACK}}(i) - m_{\text{count}}^{\text{ACK}}(i) \geq \overline{M}_{\text{sc}}^{\Phi}(l) \cdot N_L \cdot Q_m$ $d = 1$;

$m_{\text{count}}^{\text{RE}} = \overline{M}_{\text{sc}}^{\Phi}(l)$;

end if if $G^{\text{ACK}}(i) - m_{\text{count}}^{\text{ACK}}(i) < \overline{M}_{\text{sc}}^{\Phi}(l) \cdot N_L \cdot Q_m$ $d = \lfloor \overline{M}_{\text{sc}}^{\Phi}(l) \cdot N_L \cdot Q_m / (G^{\text{ACK}}(i) - m_{\text{count}}^{\text{ACK}}(i)) \rfloor$;

$m_{\text{count}}^{\text{RE}} = \lceil (G^{\text{ACK}}(i) - m_{\text{count}}^{\text{ACK}}(i)) / (N_L \cdot Q_m) \rceil$;

end if for $j = 0$ to $m_{\text{count}}^{\text{RE}} - 1$ $k = \overline{\Phi}_l(j \cdot d)$;

for $v = 0$ to $N_L \cdot Q_m - 1$ $\overline{g}_{l,k,v} = g_{m_{\text{count,all}}^{\text{ACK}}}^{\text{ACK}}$;

$m_{\text{count,all}}^{\text{ACK}} = m_{\text{count,all}}^{\text{ACK}} + 1$;

$m_{\text{count}}^{\text{ACK}}(i) = m_{\text{count}}^{\text{ACK}}(i) + 1$;

end for end for for $j = 0$ to $m_{\text{count}}^{\text{RE}} - 1$ $$\overline{\Phi}_l = \overline{\Phi}_l \setminus \{\overline{\Phi}_l(j \cdot d)\};$$

end for $$\overline{M}_{sc}^{\overline{\Phi}}(l) = |\overline{\Phi}_l|;$$

$$l = l+1;$$

while OFDM symbol(l) contains DM-RS
            $l = l + 1$
        end while
      end while
      end for
end if

Step 3:

if CSI is present for transmission on the PUSCH,

Set $m_{count}^{CSI\text{-}part1}(1) = 0$;

Set $m_{count}^{CSI\text{-}part1}(2) = 0$;

Set $m_{count,all}^{CSI\text{-}part1} = 0$;

for $i = 0$ to $N_{hop}^{PUSCH} - 1$

;$l = l^{(i)}$ while $\overline{M}_{sc}^{\overline{\Phi}}(l) - \overline{M}_{sc,rvd}^{\overline{\Phi}}(l) \leq 0$ or OFDM symbol(l) contains DM-RS $l = l+1$;

end while while $m_{count}^{CSI\text{-}part1}(i) < G^{CSI\text{-}part1}(i)$ if $G^{CSI\text{-}part1}(i) - m_{count}^{CSI\text{-}part1}(i) \geq \left(\overline{M}_{sc}^{\overline{\Phi}}(l) - \overline{M}_{sc,rvd}^{\overline{\Phi}}(l)\right) \cdot N_L \cdot Q_m$ $d = 1$;

$m_{count}^{RE} = \overline{M}_{sc}^{\overline{\Phi}}(l) - \overline{M}_{sc,rvd}^{\overline{\Phi}}(l)$;

end if if $G^{CSI\text{-}part1}(i) - m_{count}^{CSI\text{-}part1}(i) < \left(\overline{M}_{sc}^{\overline{\Phi}}(l) - \overline{M}_{sc,rvd}^{\overline{\Phi}}(l)\right) \cdot N_L \cdot Q_m$ $$d = \left\lfloor \left(\overline{M}_{sc}^{\overline{\Phi}}(l) - M_{sc,rvd}^{\overline{\Phi}}(l)\right) \cdot N_L \cdot Q_m \Big/ \left(G^{CSI\text{-}part1}(i) - m_{count}^{CSI\text{-}part1}(i)\right) \right\rfloor;$$

$$m_{count}^{RE} = \left\lceil \left(G^{CSI\text{-}part1}(i) - m_{count}^{CSI\text{-}part1}(i)\right) / (N_L \cdot Q_m) \right\rceil;$$

end if $$\overline{\Phi}_l^{temp} = \overline{\Phi}_l \setminus \overline{\Phi}_l^{rvd};$$

for $j = 0$ to $m_{count}^{RE} - 1$ $k = \overline{\Phi}_l^{temp}(j \cdot d)$;

for $v = 0$ to $N_L \cdot Q_m - 1$ $$\overline{g}_{l,k,v} = g_{m_{count,all}^{CSI\text{-}part1}}^{CSI\text{-}part1};$$

$$m_{count,all}^{CSI\text{-}part1} = m_{count,all}^{CSI\text{-}part1} + 1;$$

$$m_{count}^{CSI\text{-}part1}(i) = m_{count}^{CSI\text{-}part1}(i) + 1;$$

end for end for for $j = 0$ to $m_{count}^{RE} - 1$ $$\overline{\Phi}_l = \overline{\Phi}_l \setminus \{\overline{\Phi}_l^{temp}(j \cdot d)\};$$

end for $\overline{M}_{sc}^{\Phi}(l) = |\overline{\Phi}_l|;$ $l = l+1;$ while OFDM symbol(l) contains DM-RS $\quad l = l + 1$ end while end while end for Set $m_{count}^{CSI\text{-}part2}(1) = 0;$ Set $m_{count}^{CSI\text{-}part2}(2) = 0;$ Set $m_{count,all}^{CSI\text{-}part2} = 0;$ for $i = 0$ to $N_{hop}^{PUSCH} - 1$ $l = l^{(i)};$ while $\overline{M}_{sc}^{\Phi}(l) \leq 0$ or OFDM symbol(l) contains DM-RS $\quad l = l+1;$ end while while $m_{count}^{CSI\text{-}part2}(i) < G^{CSI\text{-}part2}(i)$ if $G^{CSI\text{-}part2}(i) - m_{count}^{CSI\text{-}part2}(i) \geq \overline{M}_{sc}^{\Phi}(l) \cdot N_L \cdot Q_m$ $\quad d = 1;$ $\quad m_{count}^{RE} = \overline{M}_{sc}^{\Phi}(l);$ end if if $G^{CSI\text{-}part2}(i) - m_{count}^{CSI\text{-}part2}(i) < \overline{M}_{sc}^{\Phi}(l) \cdot N_L \cdot Q_m$ $\quad d = \lfloor \overline{M}_{sc}^{\Phi}(l) \cdot N_L \cdot Q_m / (G^{CSI\text{-}part2}(i) - m_{count}^{CSI\text{-}part2}(i)) \rfloor;$ $\quad m_{count}^{RE} = \lceil (G^{CSI\text{-}part2}(i) - m_{count}^{CSI\text{-}part2}(i))/(N_L \cdot Q_m) \rceil;$ end if for $j = 0$ to $m_{count}^{RE} - 1$ $\quad k = \overline{\Phi}_l(j \cdot d);$ for $v = 0$ to $N_L \cdot Q_m - 1$ $\quad \overline{g}_{l,k,v} = g_{m_{count,all}^{CSI\text{-}part2}}^{CSI\text{-}part2};$ $\quad m_{count,all}^{CSI\text{-}part2} = m_{count,all}^{CSI\text{-}part2} + 1;$ $\quad m_{count}^{CSI\text{-}part2}(i) = m_{count}^{CSI\text{-}part2}(i) + 1;$ end for end for for $j = 0$ to $m_{count}^{RE} - 1$ $\quad \overline{\Phi}_l = \overline{\Phi}_l \setminus \{\overline{\Phi}_l(j \cdot d)\};$ end for $\overline{M}_{sc}^{\Phi}(l) = |\overline{\Phi}_l|;$ $l = l+1$;
while OFDM symbol(l) contains DM-RS
$l = l + 1$
end while
end while
end for
end if

Step 4:
Set $m_{\text{count}}^{\text{UL-SCH}} = 0$;
for $l = 0$ to $N_{\text{symb,all}}^{\text{PUSCH}} - 1$
    for $j = 0$ to $\overline{M}_{\text{sc}}^{\Phi}(l) - 1$
        $k = \overline{\Phi}_l(j)$;
        for $v = 0$ to $N_L \cdot Q_m - 1$
            $\overline{g}_{l,k,v} = g_{m_{\text{count}}^{\text{UL-SCH}}}^{\text{UL-SCH}}$;
            $m_{\text{count}}^{\text{UL-SCH}} = m_{\text{count}}^{\text{UL-SCH}} + 1$;
        end for
    end for
end for

Step 5:
if HARQ-ACK is present for transmission on the PUSCH and the number of HARQ-ACK information bits is no more than 2,
    Set $m_{\text{count}}^{\text{ACK}}(1) = 0$;
    Set $m_{\text{count}}^{\text{ACK}}(2) = 0$;
    Set $m_{\text{count,all}}^{\text{ACK}} = 0$;
        for $i = 0$ to $N_{\text{hop}}^{\text{PUSCH}} - 1$
        $l = l^{(i)}$;
        while $m_{\text{count}}^{\text{ACK}}(i) < G^{\text{ACK}}(i)$
            if $G^{\text{ACK}}(i) - m_{\text{count}}^{\text{ACK}}(i) \geq M_{\text{sc}}^{\Phi}(l) \cdot N_L \cdot Q_m$
                $d = 1$;
                $m_{\text{count}}^{\text{RE}} = M_{\text{sc}}^{\Phi}(l)$;
            end if
            if $G^{\text{ACK}}(i) - m_{\text{count}}^{\text{ACK}}(i) < M_{\text{sc}}^{\Phi}(l) \cdot N_L \cdot Q_m$
                $d = \lfloor M_{\text{sc}}^{\Phi}(l) \cdot N_L \cdot Q_m / (G^{\text{ACK}}(i) - m_{\text{count}}^{\text{ACK}}(i)) \rfloor$;
                $m_{\text{count}}^{\text{RE}} = \lceil (G^{\text{ACK}}(i) - m_{\text{count}}^{\text{ACK}}(i))/(N_L \cdot Q_m) \rceil$;
            end if
            for $j = 0$ to $m_{\text{count}}^{\text{RE}} - 1$
                ;$k = \Phi_l^{rvd}(j \cdot d)$
                for $v = 0$ to $N_L \cdot Q_m - 1$ $$\bar{g}_{l,k,v} = g^{ACK}_{m^{ACK}_{count,all}};$$

$$m^{ACK}_{count,all} = m^{ACK}_{count,all} + 1;$$

$$m^{ACK}_{count}(i) = m^{ACK}_{count}(i) + 1;$$

end for
      end for
      $l = l+1$;
      while OFDM symbol(l) contains DM-RS
        $l = l + 1$
    end whileend while
      end for
end if

Step 6:
Set $t = 0$;
for $l = 0$ to $N^{PUSCH}_{symb,all} - 1$
    for $j = 0$ to $M^{\Phi}_{sc}(l) - 1$
      $k = \Phi_l(j)$;
      for $v = 0$ to $N_L \cdot Q_m - 1$
        $g_t = \bar{g}_{l,k,v}$;
        $t = t+1$;
      end for
    end
end for ---------------------------------------\<End of Text Proposal\>---------------------------------------

4   CONCLUSION

In this contribution we address UCI on PUSCH multiplexing and analyse the current text in Section 6.2.7 of 38.212. The following proposals are made and a text proposal for Proposal 1 is included in Section 3.

Proposal 1:
    Update Subclause 6.2.7 of [1] to
    4.  Map ACK/NACK only to non-DM-RS symbols
    5.  CSI mapping starts in last (or next non-DM-RS symbol, depending on RE availability) OFDM symbol carrying ACK/NACK
    6.  CSI is not mapped to DM-RS symbols

Proposal 2:
        For PUSCH transmissions scheduled by fallback DCI (Format 0_0), UE does not include a CSI1 report.

5 REFERENCES

[1] 38.212, v2.0.0

The invention claimed is:

1. A method implemented in a wireless device, the method comprising:
    receiving a Downlink Control Information (DCI) message for scheduling transmission on a Physical Uplink Shared Channel (PUSCH), the DCI message having a DCI format 0_0, the DCI format 0_0 corresponding to a format without an uplink downlink assignment index (DAI) in an uplink grant; and
    if a quantity of Hybrid Automatic Repeat Request (HARQ) information bits to be transmitted on the scheduled PUSCH is one information bit, reserving resources on the scheduled PUSCH for 2 HARQ bits.

2. The method of claim 1 further comprising:
    transmitting the scheduled PUSCH based on the DCI message.

3. The method of claim 1, wherein the DCI message does not contain an indication of how many resources to reserve for HARQ bits.

4. The method of claim 1, wherein the DCI message is of fallback DCI message.

5. The method of claim 1, wherein the transmission on the scheduled PUSCH does not include Channel State Information (CSI) in the transmission.

6. The method of claim 1, wherein the transmission on the scheduled PUSCH includes reserving resources on the scheduled PUSCH for at least one HARQ bit if the wireless device has Channel State Information (CSI) to report.

7. The method of claim 1, wherein the transmission on the scheduled PUSCH includes mapping a first part of Channel State Information (CSI) to predefined portion of the scheduled PUSCH.

8. The method of claim 1, wherein the predefined portion of the scheduled PUSCH corresponds to an end portion of the scheduled PUSCH.

9. A wireless device configured to communicate with a network node, the wireless device comprising a radio interface and a processing circuitry, where the processing circuitry is configured to:
    receive a Downlink Control Information (DCI) message for scheduling transmission on a Physical Uplink Shared Channel (PUSCH), the DCI message having a DCI format 0_0, the DCI format 0_0 corresponding to a format without an uplink downlink assignment index (DAI) in an uplink grant; and
    if a quantity of Hybrid Automatic Repeat Request (HARQ) information bits to be transmitted on the scheduled PUSCH is one information bit, reserve resources on the scheduled PUSCH for 2 HARQ bits.

10. The wireless device of claim 9, where the processing circuitry is further configured to transmit the scheduled PUSCH based on the DCI message.

11. The wireless device of claim 9, wherein the DCI message does not contain an indication of how many resources to reserve for HARQ bits.

12. The wireless device of claim 9, wherein the transmission on the scheduled PUSCH does not include Channel State Information (CSI) in the transmission.

13. The wireless device of claim 9, wherein the transmission on the scheduled PUSCH includes reserving sources on the scheduled PUSCH for at least one HARQ bit if the wireless device has Channel State Information (CSI) to report.

14. The wireless device of claim 9, wherein transmission on the scheduled PUSCH includes mapping a first part of Channel State Information (CSI) to predefined portion of the scheduled PUSCH.

15. The wireless device of claim 9, wherein the predefined portion of the scheduled PUSCH corresponds to an end portion of the scheduled PUSCH.

16. A network node configured to communicate with a wireless device, the network node comprising a radio interface and comprising processing circuitry, where the processing circuitry is configured to:
    schedule the wireless device on a Physical Uplink Shared Channel (PUSCH) using a Downlink Control Information (DCI) message, the DCI message having a DCI format 0_0, the DCI format 0_0 corresponding to a format without an uplink downlink assignment index (DAI) in an uplink grant; and
    transmit the DCI message to the wireless device, the DCI message configured to, if a quantity of Hybrid Automatic Repeat Request (HARQ) information bits to be transmitted on the scheduled PUSCH is one information bit, reserve resources on the scheduled PUSCH for 2 HARQ bits.

17. The network node of claim 16, wherein the DCI message does not contain an indication of how many resources to reserve for HARQ bits.

18. A method implemented in a network node, the method comprising:
    scheduling the wireless device on a Physical Uplink Shared Channel (PUSCH) using a Downlink Control Information (DCI) message, the DCI message having a DCI format 0_0, the DCI format 0_0 corresponding to a format without an uplink downlink assignment index (DAI) in an uplink grant; and
    transmitting the DCI message to the wireless device, the DCI message configured to, if a quantity of Hybrid Automatic Repeat Request (HARQ) information bits to be transmitted on the scheduled PUSCH is one information bit, reserve resources on the scheduled PUSCH for 2 HARQ bits.

19. The method of claim 18, wherein the DCI message does not contain an indication of how many resources to reserve for HARQ bits.

* * * * *

UNITED STATES PATENT AND TRADEMARK OFFICE
CERTIFICATE OF CORRECTION

PATENT NO. : 10,587,386 B2
APPLICATION NO. : 16/245407
DATED : March 10, 2020
INVENTOR(S) : Larsson et al.

It is certified that error appears in the above-identified patent and that said Letters Patent is hereby corrected as shown below:

In Column 5, Line 30, delete "(RRU)" and insert -- (RRU), --, therefor.

In Column 7, Line 41, delete "Array)" and insert -- Array(s)) --, therefor.

In Column 7, Line 42, delete "Circuitry)" and insert -- Circuitry(s)) --, therefor.

In Column 8, Line 41, delete "Array)" and insert -- Array(s)) --, therefor.

In Column 8, Line 42, delete "Circuitry)" and insert -- Circuitry(s)) --, therefor.

In Column 9, Line 29, delete "Array)" and insert -- Array(s)) --, therefor.

In Column 9, Line 30, delete "Circuitry)" and insert -- Circuitry(s)) --, therefor.

In Column 14, Line 64, delete "CSI/CSI" and insert -- DCI/CSI --, therefor.

Signed and Sealed this
Twenty-third Day of June, 2020

Andrei Iancu
*Director of the United States Patent and Trademark Office*